(12) United States Patent
Qiao et al.

(10) Patent No.: US 11,848,973 B2
(45) Date of Patent: *Dec. 19, 2023

(54) MEDIA STREAM SENDING METHOD, APPARATUS, SYSTEM AND DEVICE

(71) Applicant: Huawei Technologies Co., Ltd., Shenzhen (CN)

(72) Inventors: Naiqiang Qiao, Nanjing (CN); Jun Zhou, Nanjing (CN); Mingli Zhang, Shenzhen (CN); Yi Kai, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/675,236

(22) Filed: Feb. 18, 2022

(65) Prior Publication Data

US 2022/0174104 A1 Jun. 2, 2022

Related U.S. Application Data

(63) Continuation of application No. 17/369,580, filed on Jul. 7, 2021, now Pat. No. 11,330,028, which is a (Continued)

(30) Foreign Application Priority Data

Apr. 23, 2019 (CN) .......................... 201910330890.5

(51) Int. Cl.
*G06F 15/16* (2006.01)
*H04L 65/611* (2022.01)
(Continued)

(52) U.S. Cl.
CPC .......... *H04L 65/611* (2022.05); *H04L 65/403* (2013.01); *H04L 67/2866* (2013.01); *H04L 67/568* (2022.05)

(58) Field of Classification Search
CPC .............. H04L 65/4076; H04L 65/403; H04L 67/2842; H04L 67/2866; H04L 65/611; H04L 67/568
(Continued)

(56) References Cited

U.S. PATENT DOCUMENTS 6,966,009 B1 * 11/2005 Boduch ................ H04J 3/0688
713/502
7,031,348 B1 4/2006 Gazit
(Continued)

FOREIGN PATENT DOCUMENTS

CN 102780916 A 11/2012
CN 104168300 A 11/2014
(Continued)

*Primary Examiner* — Liang Che A Wang
(74) *Attorney, Agent, or Firm* — Conley Rose, P.C.

(57) ABSTRACT

A media stream sending method, apparatus, and system includes a proxy server that receives a first live broadcast room request message and a second live broadcast room request message that are sent by a same proxy client; the proxy server receives a first live media stream that is sent by a media server to a first client and a second live media stream that is sent by the media server to a second client; and when a role of the first client is a master user and a role of the second client is a slave user, the proxy server sends the first live media stream to the proxy client such that the proxy client sends the first live media stream to the first client and the second client.

18 Claims, 17 Drawing Sheets

Related U.S. Application Data continuation of application No. PCT/CN2020/086335, filed on Apr. 23, 2020.

(51) Int. Cl.
*H04L 65/403* (2022.01)
*H04L 67/2866* (2022.01)
*H04L 67/568* (2022.01)

(58) Field of Classification Search
USPC .................................. 709/227, 228, 231
See application file for complete search history.

(56) References Cited

U.S. PATENT DOCUMENTS

| | | | |
|---|---|---|---|
| 8,516,253 B1* | 8/2013 | Sebastian | G06F 21/6218 713/168 |
| 10,044,827 B1* | 8/2018 | Kaukl | H04L 67/568 |
| 2004/0030837 A1* | 2/2004 | Geiner | G06F 11/2064 714/E11.107 |
| 2008/0187075 A1 | 8/2008 | Nakagawa | |
| 2008/0298353 A1* | 12/2008 | Zhu | H04L 65/1095 370/356 |
| 2011/0291723 A1* | 12/2011 | Hashimoto | H04N 21/43072 327/161 |
| 2014/0372624 A1 | 12/2014 | Wang et al. | |
| 2016/0157026 A1* | 6/2016 | Guindi | H04R 25/552 381/60 |
| 2017/0134825 A1* | 5/2017 | Tian | H04N 21/816 |
| 2018/0012192 A1* | 1/2018 | Rosenberg | H04L 65/403 |
| 2018/0077431 A1 | 3/2018 | Wei et al. | |
| 2018/0098028 A1* | 4/2018 | Mu | H04N 21/2187 |
| 2018/0146024 A1* | 5/2018 | Wang | H04N 21/438 |
| 2018/0192087 A1* | 7/2018 | Dudko | H04N 21/814 |
| 2018/0376195 A1* | 12/2018 | Lu | H04N 21/42204 |
| 2019/0208230 A1* | 7/2019 | Fan | H04N 21/4788 |
| 2019/0379916 A1 | 12/2019 | Lan | |
| 2019/0387263 A1* | 12/2019 | Xu | H04N 21/23614 |
| 2020/0107050 A1 | 4/2020 | Peng et al. | |

FOREIGN PATENT DOCUMENTS

| | | |
|---|---|---|
| CN | 105307010 A | 2/2016 |
| CN | 105308932 A | 2/2016 |
| CN | 105763832 A | 7/2016 |
| CN | 107332894 A | 11/2017 |
| CN | 107896337 A | 4/2018 |
| CN | 105141971 B | 8/2018 |
| CN | 109005204 A | 12/2018 |
| CN | 109547812 A | 3/2019 |
| CN | 109639635 A | 4/2019 |
| JP | H1063598 A | 3/1998 |
| JP | 2002507375 A | 3/2002 |
| JP | 2006352648 A | 12/2006 |
| JP | 2008193500 A | 8/2008 |
| JP | 2013058817 A | 3/2013 |
| JP | 2017138847 A | 8/2017 |
| WO | 2018219048 A1 | 12/2018 |

* cited by examiner

MEDIA STREAM SENDING METHOD, APPARATUS, SYSTEM AND DEVICE

CROSS-REFERENCE TO RELATED APPLICATIONS

This application is a continuation of U.S. patent application Ser. No. 17/369,580, filed on Jul. 7, 2021, which is a continuation of International Patent Application No. PCT/CN2020/086335, filed on Apr. 23, 2020, which claims priority to Chinese Patent Application No. 201910330890.5, filed on Apr. 23, 2019. All of the aforementioned applications are hereby incorporated by reference in their entireties.

TECHNICAL FIELD

This application relates to the field of video playing, and in particular, to a media stream sending method, apparatus, and system, and a device.

BACKGROUND

A user may watch a video in a live broadcast mode or a video on demand mode. In the video on demand mode, when watching the video, the user can fast forward or rewind video content at any time, but cannot fast forward or rewind video content in the live broadcast mode. Live broadcast may be generally understood as a process in which all frames of data are labeled with time sequence tags and then are streamed. Further, a collection apparatus such as a camera or a microphone continuously collects audio or video information, then performs processing on the information such as encoding, encapsulation, and stream pushing, and then transmits the information through a delivery network. A playing end continuously downloads data, and decodes the data based on a time sequence for playing. An overall procedure of video live broadcast includes a series of processes: collection, encoding, stream pushing, transcoding, delivery, decoding/rendering, and the like.

Mainstream vendors for Internet video live broadcast usually use a unicast transmission protocol for video transmission. Therefore, if N users are watching a video, there are N channels of video streams. In addition, for enterprise live video broadcast, functions such as sharing a presented document and making text comments need to be supported during video live broadcast. That is, the shared document and the text comments are displayed while video content is displayed on a web page of the enterprise live broadcast, to satisfy user requirements and improve user experience.

To improve user experience and save backbone network bandwidth, a live content delivery network (CDN) is typically deployed on a live broadcast platform. The live CDN is a distributed content delivery platform and supports a multi-layer architecture. On the live CDN platform, servers for caching can be deployed at different layers, to provide a nearby service for users in different regions.

In a process of delivering audio and video streams through the live CDN, a Real Time Message Protocol (RTMP), also referred to as a real time message transport protocol, is typically used in video stream pushing and stream distribution processes; and three protocols are typically used in a delivery process are the RTMP, an HTTP Live Streaming (HLS) Protocol, and a Hypertext Transfer Protocol (HTTP)-flash video (FLV), where the HTTP-flash video is referred to as "HTTP-FLV". The HLS protocol is an HTTP-based streaming media transmission protocol developed by Apple Inc. The HLS protocol is mainly applied to iPhone® OS (iOS) devices, including iPhones, iPad®, iPod® touches, and Mac OS X, to provide audio and video live services and recorded content video on demand (VOD) services. The HLS protocol has the following advantage: According to the HLS protocol, a client does not request a complete data stream at a time; instead, streaming media data is segmented into smaller files with shorter duration at a server end and the smaller files are accessed in sequence based on index files. Audio and video can be played provided that the client continuously and sequentially plays the smaller files received from the server.

As shown in FIG. 1, in the live CDN, a content source sends audio and video media streams to an enterprise data center (EDC) using the RTMP, where the EDC includes a web server and a plurality of media servers. The web server in the EDC responds to a request, from a client (PC), for watching a live program, authenticates a user, and allocates a closest media server to provide a service for the user based on a location of the user. The selected media server sends the audio and video media streams to a lower-level region data center (RDC) according to a preset policy. After receiving the media stream (live content), a media server in the RDC delivers, according to a preset policy, the media stream to a lower-level media server in a server room (SR). Finally, the media server in the server room caches the media stream (the live content) delivered by the upper-level media server, and directly provides a live broadcast service for the user.

In this process, the media server in the upper-level RDC needs to send the live media stream to each client that requests the media stream in a live broadcast room such that the media server in the upper-level RDC needs to send the live media stream to each user in the live broadcast room. When there is a large quantity of users that enter the live broadcast room, a large quantity of wide area network (WAN) resources is required for live media stream transmission, resulting in heavy network overheads.

SUMMARY

Embodiments of this application provide a media stream sending method, apparatus, and system, and a device, to reduce resource overheads for sending a media stream to clients in a same live broadcast room by a media server. Further, the embodiments of this application disclose the following technical solutions.

According to a first aspect, this application provides a media stream sending method, where the method provides a live media stream for a client that enters a live broadcast room. The method includes a proxy server receives a first live broadcast room request message and a second live broadcast room request message that are used to request to enter the live broadcast room and that are sent by a same proxy client, where the first live broadcast room request message is from a first client, and the second live broadcast room request message is from a second client. The proxy server receives a first live media stream that is sent by a media server to the first client through the proxy server and a second live media stream that is sent by the media server to the second client through the proxy server. The proxy server determines a role of the first client based on the first live broadcast room request message, and determines a role of the second client based on the second live broadcast room request message. When determining that the role of the first client is a master user, and that the role of the second client is a slave user, the proxy server sends only the first live media stream to the proxy client such that the proxy client sends the first live media stream to the first client and the second client.

According to the method provided in this aspect, when the second client whose role is the slave user requests to obtain a live media stream, the proxy client needs to directly send, to the second client, only the locally cached first live media stream that is requested by the first client whose role is the master user such that the proxy server does not need to send the live media stream to the proxy client again, and the proxy server does not need to send the live media stream to each client that enters the live broadcast room through the proxy client. This method reduces traffic for media stream transmission between the proxy server and the proxy client, effectively reduces egress bandwidth, and reduces resource overheads.

With reference to the first aspect, in a possible implementation of the first aspect, the first live broadcast room request message includes an identifier of the proxy client, and the second live broadcast room request message includes the identifier of the proxy client. The method further includes the proxy server determines, based on the identifier of the proxy client included in the first live broadcast room request message and the identifier of the proxy client included in the second live broadcast room request message, that the first live broadcast room request message and the second live broadcast room request message are from the same proxy client. In this aspect, the identifier of the proxy client is carried in the first live broadcast room request message or the second live broadcast room request message such that the proxy server can determine a receive end when forwarding a message and a response, thereby facilitating message receiving and sending.

With reference to the first aspect, in another possible implementation of the first aspect, that the proxy server determines a role of the second client based on the second live broadcast room request message includes the proxy server determines, when the second live broadcast room request message is received, whether there is a client, in the live broadcast room, whose role is a master user in the live broadcast room and that enters the live broadcast room through the proxy client; and if there is a client, in the live broadcast room, whose role is a master user in the live broadcast room and that enters the live broadcast room through the proxy client, the proxy server determines that the role of the second client is the slave user. In this implementation, in a technical scenario in which there is a single master user, the proxy server needs to determine only whether there is a master user in the live broadcast room such that the proxy server can determine an identity role of a client that enters the live broadcast room. Therefore, the role of the client can be quickly identified and marked.

Correspondingly, if there is no client whose role is a master user, the proxy server determines that the role of the second client is a master user.

With reference to the first aspect, in still another possible implementation of the first aspect, after the proxy server sends the first live media stream to the proxy client, the method further includes the proxy server receives a request message that is sent by the proxy client and that is for exiting the live broadcast room, where the request message for exiting the live broadcast room is used to request the first client to exit the live broadcast room; when determining the second client as a new master user, the proxy server changes the role of the second client from the slave user to a master user; and the proxy server switches, to the second live media stream, the first live media stream that is sent to the second client. In this implementation, when the first client whose role is the master user exits the live broadcast room, an identity of the second client whose role is the new master user is used to request and obtain a live media stream from the media server in order to ensure that the second client that watches media content still in the live broadcast room is not affected, and ensure user experience of watching live broadcast of a user of the second client in the live broadcast room.

With reference to the first aspect, in still another possible implementation of the first aspect, the last frame of the first live media stream that is sent by the proxy server to the second client and the first frame of the second live media stream that is sent by the proxy server to the second client are adjacent frames. Before the proxy server switches, to the second live media stream, the first live media stream that is sent to the second client, the method further includes: The proxy server identifies, based on the first live media stream and the second live media stream, a first I frame and a second I frame that belong to the first live media stream and the second live media stream respectively, where the first I frame and the second I frame are a same video frame.

The proxy server determines, based on the first I frame and the second I frame, a first switching frame and a second switching frame that are adjacent to each other and that belong to the first live media stream and the second live media stream respectively, and uses the first switching frame and the second switching frame as the last frame of the first live media stream that is sent to the second client and the first frame of the second live media stream that is sent to the first client, respectively. After the proxy server determines the first switching frame and the second switching frame, the method further includes: The proxy server forwards the request message for exiting the live broadcast room from the first client to the media server.

With reference to the first aspect, in still another possible implementation of the first aspect, that the proxy server determines a role of the second client based on the second live broadcast room request message includes: The proxy server determines whether a quantity of clients whose roles are master users and that enter the live broadcast room through the proxy client reaches a preset upper limit when the proxy server receives the second live broadcast room request message, where the preset upper limit is greater than or equal to 2. If the quantity of clients whose roles are master users and that enter the live broadcast room through the proxy client reaches the preset upper limit, the proxy server determines that the role of the second client is the slave user. In this implementation, in a technical scenario in which there are a plurality of master users, that is, in a scenario in which there are one main-master user and a plurality of secondary-master users, a quantity of clients serving as master users in the live broadcast room is calculated and compared with the preset upper limit in order to determine a role of a client. It can be understood that a role of a client may alternatively be determined in another manner. For example, a role of a client may be determined based on a quantity of live broadcast room requests. This is not limited in this embodiment.

With reference to the first aspect, in still another possible implementation of the first aspect, if the quantity of clients whose roles are master users in the live broadcast room is not 0 and does not reach the preset upper limit, the proxy server determines that the role of the second client is a secondary-master user.

With reference to the first aspect, in still another possible implementation of the first aspect, when the first client is a main-master user, and the second client is the slave user, the method further includes: The proxy server receives, from the first client, a request message for exiting the live broadcast room; when determining the second client as a new secondary-master user, the proxy server changes the role of the second client from the slave user to a secondary-master user; and the proxy server caches the received second live media stream by groups of pictures (GOPs). In this implementation, when the second client is the secondary-master user, the proxy server receives the second live media stream from the media server, and stores the second live media stream locally in order to provide the cached second live media stream for a client in the live broadcast room when a user role changes subsequently.

With reference to the first aspect, in still another possible implementation of the first aspect, when the first client is a main-master user, and the second client is the secondary-master user, the method further includes: The proxy server caches the received second live media stream by GOPs; and the proxy server identifies, based on the first live media stream and the cached second live media stream, a first I frame and a second I frame that belong to the first live media stream and the second live media stream respectively, where the first I frame and the second I frame are a same video frame.

With reference to the first aspect, in still another possible implementation of the first aspect, the method further includes: The proxy server receives, from the first client, a request message for exiting the live broadcast room; when determining the second client as a new main-master user, the proxy server changes the role of the second client from the secondary-master user to a main-master user; the proxy server determines, based on the first I frame and the second I frame, a first switching frame and a second switching frame that are adjacent to each other and that belong to the first live media stream and the second live media stream respectively; and the proxy server switches, to the second live media stream based on the first switching frame and the second switching frame, the first live media stream sent to the second client, where the last frame of the first live media stream that is sent by the proxy server to the second client is the first switching frame, and the first frame of the second live media stream that is sent by the proxy server to the first client is the second switching frame. In this implementation, when the role of the second client changes from the secondary-master user to the main-master user, the proxy server receives and caches the second live media stream from the media server, duplicates the cached second live media stream, and delivers the duplicated cached second live media stream to all clients in the live broadcast room in order to ensure that the other clients in the live broadcast room normally watch the live broadcast content without being affected.

With reference to the first aspect, in still another possible implementation of the first aspect, the proxy server caches the first live media stream and the second live media stream by GOPs. Optionally, the proxy server locally caches three GOPs of the first live media stream and three GOPs of the second live media stream.

According to a second aspect, an embodiment of this application further provides a media stream sending method. The method provides a live media stream for a client that enters a live broadcast room. The method includes a proxy client receives a first live broadcast room request message that is used to request to enter a live broadcast room and that is sent by a first client, and a second live broadcast room request message that is used to request to enter the live broadcast room and that is sent by a second client; the proxy client sends the first live broadcast room request message and the second live broadcast room request message to a media server through a proxy server; the proxy client receives a first live media stream sent by the proxy server, where the first live media stream is a media stream that is sent by the media server to the first client through the proxy server, a role of the first client is a master user, and a role of the second client is a slave user; and the proxy client sends the first live media stream to the first client and the second client.

According to the method provided in this aspect, for all users that enter the live broadcast room through the same proxy client, the proxy server needs to send only one live media stream to the proxy client, that is, the proxy client consumes wide area network bandwidth to receive the one live media stream sent by the proxy server. In comparison with transmission resources occupied when the media server sends the live media stream to each client in the live broadcast room, this reduces WAN network link load and reduces transmission overheads.

With reference to the second aspect, in a possible implementation of the second aspect, before the proxy client sends the first live broadcast room request message to the media server through the proxy server, the method further includes the proxy client adds an identifier of the proxy client to the first live broadcast room request message; and before the proxy client sends the second live broadcast room request message to the media server through the proxy server, the method further includes the proxy client adds the identifier of the proxy client to the second live broadcast room request message.

With reference to the second aspect, in another possible implementation of the second aspect, after the proxy client receives the first live media stream sent by the proxy server, the method further includes the proxy client caches the first live media stream by GOPs.

With reference to the second aspect, in still another possible implementation of the second aspect, before the proxy client sends the first live media stream to the second client, the method further includes the proxy client adjusts a timestamp of the first live media stream such that an adjusted timestamp satisfies that a timestamp of the first frame of the first live media stream that is sent by the proxy client to the second client is 0, and that timestamps of adjacent frames of the first live media stream that is sent to the second client are consecutive.

With reference to the second aspect, in still another possible implementation of the second aspect, when the first client requests to exit the live broadcast room, the method further includes the proxy client receives a second live media stream sent by the proxy server, where the second live media stream is a media stream that is sent by the media server to the second client through the proxy client, and the second client is a client whose role changes from the slave user to a master user; and the proxy client sends the second live media stream to the second client.

With reference to the second aspect, in still another possible implementation of the second aspect, before the proxy client sends the second live media stream to the second client, the method further includes the proxy client adjusts a timestamp of the second live media stream such that an adjusted timestamp satisfies that a timestamp of the first frame of the second live media stream that is sent by the proxy client to the second client and the last frame of the first live media stream that is sent by the proxy client to the second client are consecutive.

According to a third aspect, an embodiment of this application provides a media stream sending apparatus. The apparatus includes units configured to perform the method steps according to any one of the first aspect or the implementations of the first aspect. Further, the apparatus includes a receiving unit, a processing unit, and a sending unit. In addition, the apparatus may further include another module or unit, for example, a storage unit.

Optionally, the apparatus is a proxy server.

According to a fourth aspect, an embodiment of this application provides a media stream sending apparatus. The apparatus includes units configured to perform the method steps according to any one of the second aspect or the implementations of the second aspect. Further, the apparatus includes a receiving unit, a processing unit, and a sending unit. In addition, the apparatus may further include another module or unit, for example, a storage unit.

Optionally, the apparatus is a proxy client.

According to a fifth aspect, an embodiment of this application further provides a network device, including a transceiver, a processor, and a memory. The processor is coupled to the memory; and the memory is configured to store instructions. The processor is configured to invoke the instructions to enable the network device to perform the media stream sending method according to any one of the first aspect or the implementations of the first aspect or invoke the instructions to enable the network device to perform the media stream sending method according to any one of the second aspect or the implementations of the second aspect.

Optionally, the network device is a proxy server or a proxy client.

Further, in a possible implementation of this aspect, when the network device is a proxy server, the transceiver is configured to receive a first live broadcast room request message and a second live broadcast room request message that are used to request to enter the live broadcast room and that are sent by a same proxy client; and receive a first live media stream that is sent by a media server to the first client through the proxy server and a second live media stream that is sent by the media server to a second client through the proxy server, where the first live broadcast room request message is from the first client, and the second live broadcast room request message is from the second client. The processor is configured to determine a role of the first client based on the first live broadcast room request message, and determine a role of the second client based on the second live broadcast room request message. The transceiver is further configured to, when it is determined that the role of the first client is a master user and that the role of the second client is a slave user, send only the first live media stream to the proxy client such that the proxy client sends the first live media stream to the first client and the second client.

Optionally, in another possible implementation of this aspect, when the network device is a proxy client, the transceiver is configured to receive a first live broadcast room request message that is used to request to enter a live broadcast room and that is sent by a first client, and a second live broadcast room request message that is used to request to enter the live broadcast room and that is sent by a second client; send the first live broadcast room request message and the second live broadcast room request message to a media server through a proxy server. The transceiver is further configured to receive a first live media stream sent by the proxy server, and send the first live media stream to the first client and the second client. The first live media stream is a media stream that is sent by the media server to the first client through the proxy server, a role of the first client is a master user, and a role of the second client is a slave user.

According to a sixth aspect, an embodiment of this application further provides a computer-readable storage medium. The storage medium stores instructions. When the instructions are run on a computer or a processor, the method according to any one of the first aspect or the implementations of the first aspect or the method according to any one of the second aspect or the implementations of the second aspect is performed.

According to a seventh aspect, an embodiment of this application further provides a computer program product. The computer program product includes computer instructions. When the instructions are executed by a computer or a processor, the method according to any one of the first aspect or the implementations of the first aspect or the method according to any one of the second aspect or the implementations of the second aspect can be implemented.

According to an eighth aspect, an embodiment of this application further provides a media stream sending system. The system includes at least one client, a proxy client, a proxy server, and a media server. Each client accesses a live broadcast room through the proxy client. The system implements, through the proxy client and the proxy server, the media stream sending method according to any one of the first aspect, the second aspect, the implementations of the first aspect, or the implementations of the second aspect. The proxy client is configured to perform the media stream sending method according to the method according to any one of the second aspect or the implementations of the second aspect, and the proxy server is configured to perform the media stream sending method according to the method according to any one of the first aspect or the implementations of the first aspect.

Optionally, the proxy server is the media stream sending apparatus according to any one of the third aspect or the implementations of the third aspect, and the proxy client is the media stream sending apparatus according to any one of the fourth aspect or the implementations of the fourth aspect.

With reference to the eighth aspect, in a possible implementation of the eighth aspect, the proxy server and the media server are located in a region data center RDC. The RDC further includes a web server, and the web server is configured to allocate a media server to a client that enters a live broadcast room through the proxy client.

With reference to the eighth aspect, in another possible implementation of the eighth aspect, the system further includes an enterprise data center EDC and a content source.

Optionally, the media stream sending system is a content delivery network CDN system.

In addition, an embodiment of this application further provides a chip system. The chip system includes a processor and an interface circuit. The interface circuit is coupled to the processor. The processor is configured to execute a computer program or instructions, to implement the method according to any one of the first aspect or the implementations of the first aspect or implement the method according to any one of the second aspect or the implementations of the second aspect. The interface circuit is configured to communicate with another module outside the chip system.

According to the method provided in this application, when the proxy client and the proxy server obtain a live media stream requested by the client serving as the master user, some segments of the media stream are locally cached in the proxy client. When other clients enter the live broadcast room and request the live media stream, the proxy client directly sends the locally cached media stream to these clients such that the proxy server does not need to send the live media stream to the proxy client again. In this method, only the live media stream requested by the client serving as the master user is sent between the proxy server and the proxy client, in other words, wide area network bandwidth for transmitting only the live media stream is consumed. In comparison with transmission resources occupied when the media server sends the live media stream to each client through the proxy server, this reduces traffic for sending the media stream, reduces WAN network link load, and reduces resource overheads.

In addition, when the proxy client sends a live media stream to all the clients in the live broadcast room, the proxy client also adjusts a timestamp of the live media stream. For example, when the first client serving as the master user exits the live broadcast room, the proxy client switches, to the second live media stream, the first live media stream originally sent to the second client, and adjusts the timestamp of the second live media stream such that when the proxy client sends the second live media stream to the second client, the second live media stream can be seamlessly connected to media content of the first live media stream that is originally being played. This avoids video freeze or other impacts, caused by exiting of the first client, on media content watched on the second client. Therefore, according to this method, adjusting the timestamp by the proxy client also ensures user experience of watching.

DESCRIPTION OF EMBODIMENTS

To make a person skilled in the art better understand the technical solutions in the embodiments of this application, and make the objectives, features, and advantages of the embodiments of this application clearer, the following further describes the technical solutions in the embodiments of this application in detail with reference to the accompanying drawings.

Before the technical solutions in the embodiments of this application are described, an application scenario of the embodiments of this application is first described with reference to the accompanying drawings.

The technical solutions of this application may be applied to a content delivery network (CDN) system, and newly added devices in the system include a proxy server and a proxy client.

The proxy server is configured to act as a proxy for a video bearer protocol of a user, identify roles of all clients that enter a live broadcast room through the proxy server, obtain at least one live media stream from a media server, and send a live media stream of a client serving as a master user to the proxy client. In addition, when a client whose role is a master user exits live broadcast room, the proxy server is further configured to update roles of other users in the live broadcast room and switch the live media stream to a new live media stream. The proxy client is configured to act as a proxy for a video bearer protocol of a user, and receive a live media stream that is of the client whose role is the master user and that is sent by the proxy server, duplicate the live media stream and deliver the duplicated live media stream to all the clients in the live broadcast room that enter the live broadcast room through the proxy client.

Optionally, the proxy server may be located in a region data center (RDC). Further, the proxy server may be deployed on a server, or deployed on universal customer premise equipment (uCPE) through network functions virtualization (NFV).

Optionally, the proxy client may be a device located at an edge of a local area network, and a client in the local area network enters the live broadcast room through the proxy client and obtains a live media stream through the proxy client. The proxy client may be deployed on a server, or deployed on uCPE through NFV.

Figure 1:
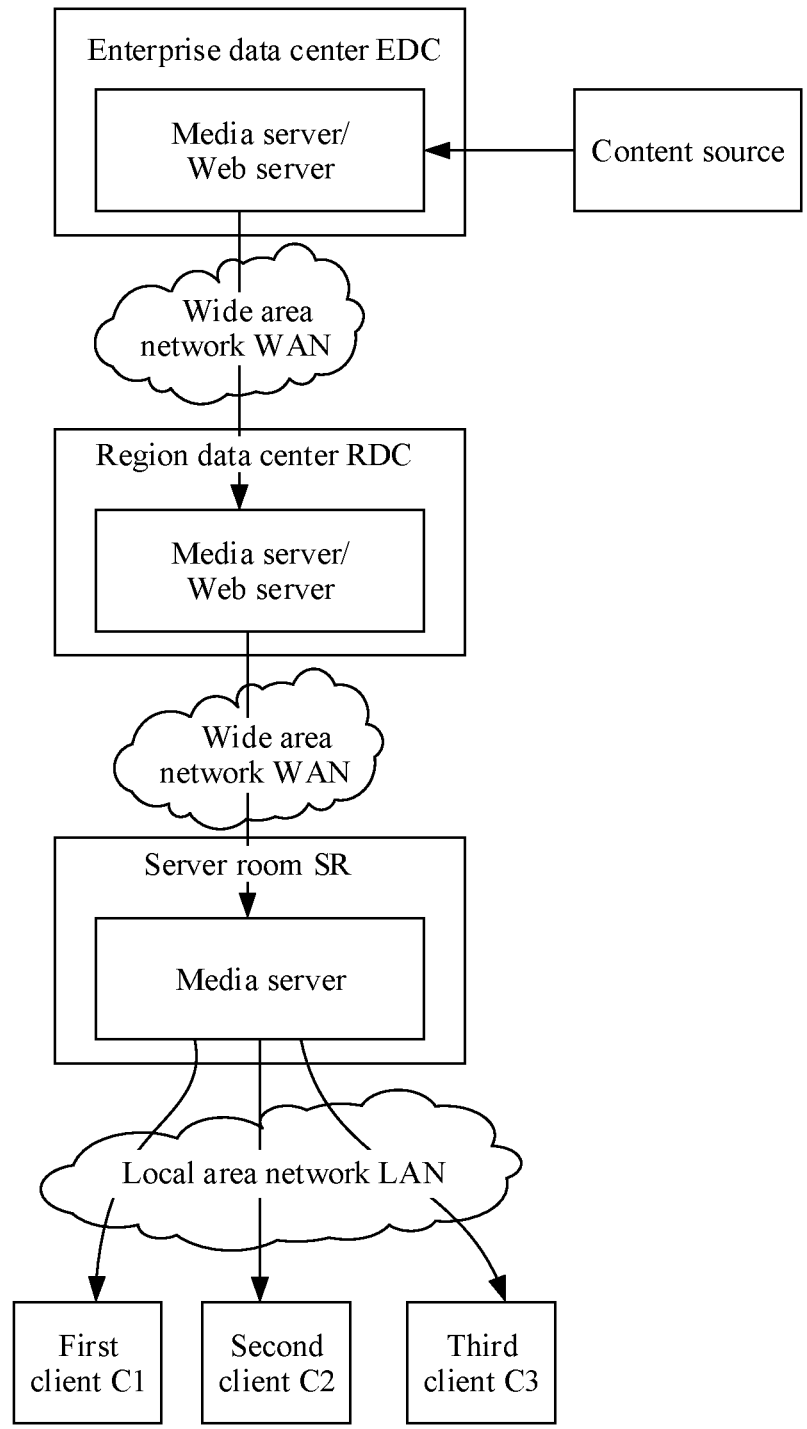
FIG. 1 is a schematic diagram of an architecture of a live broadcast system according to this application.
Figure 2:
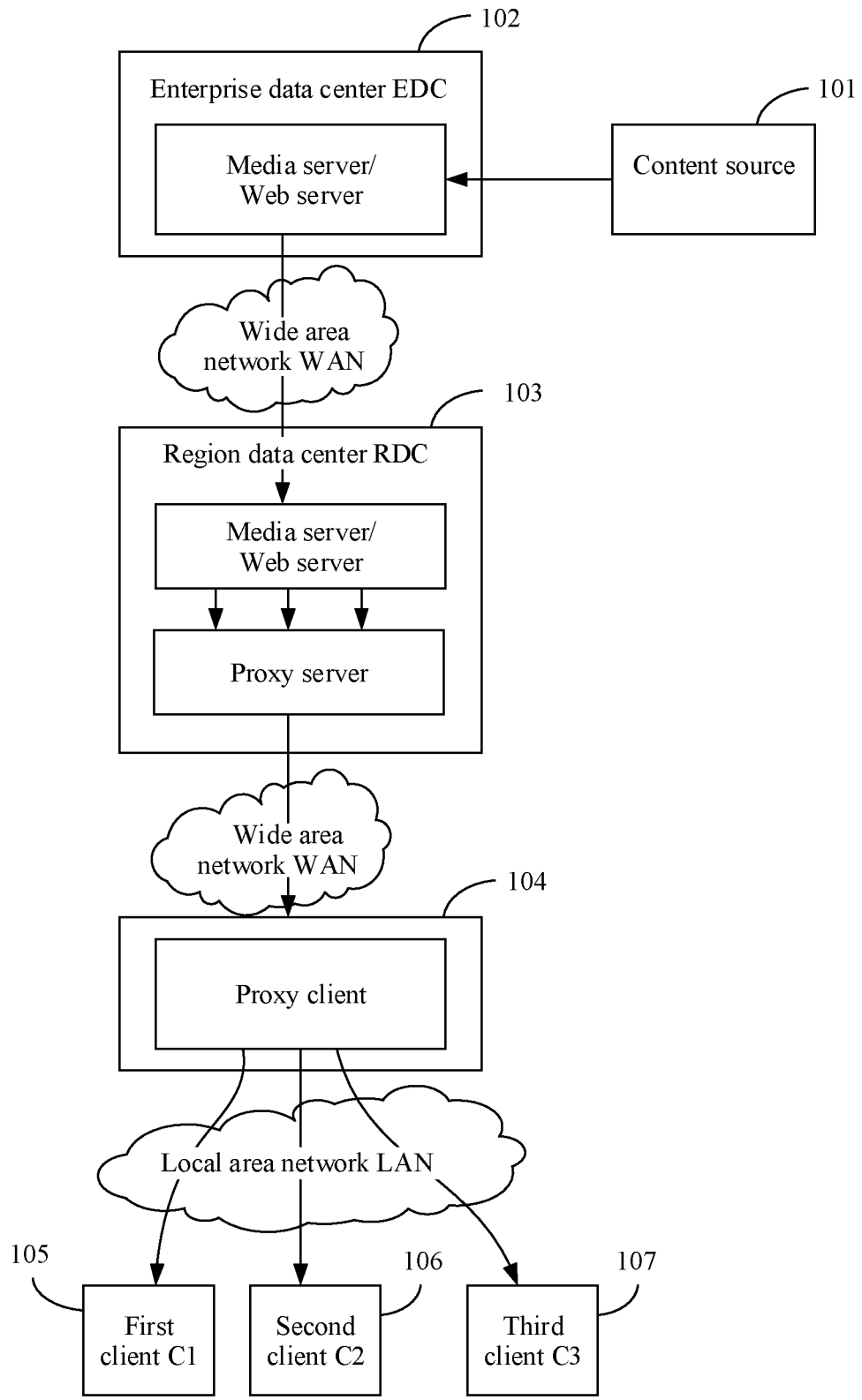
FIG. 2 is a schematic diagram of an architecture of a bilateral proxy system for video live broadcast according to an embodiment of this application.

Further, as shown in FIG. 2, an embodiment provides a video CDN system. The system includes a content source 101, an enterprise data center (EDC) 102, an RDC 103, a proxy client 104, and at least one client (client, C), for example, a first client C1 105, a second client C2 106, and a third client C3 107. The EDC 102 includes a plurality of media servers and a web server. The RDC 103 includes a proxy server, a plurality of media servers, a web server, or the like. The proxy server and the proxy client are connected to each other through a WAN network, and the proxy client and at least one client associated with the proxy client are connected to each other through a local area network (LAN).

In addition, the live broadcast CDN is a distributed content delivery platform and supports a multi-level architecture. On the live broadcast CDN platform, a plurality of media servers can be deployed at different layers, to provide a nearby service for users in different regions. When users in the EDC watches live broadcast in a live broadcast room, an allocated media server may be deployed in the RDC, and a transmitted live media stream reaches the RDC and the proxy client through a multi-protocol label switching (MPLS) private line.

Further, general descriptions of functions of the foregoing devices or network elements are described in the following Table 1.

TABLE 1

| Network element name | | Function |
| --- | --- | --- |
| Content source | | Is a production end of live media streams (live broadcast content). |
| EDC | Web server | Responds to requests, from clients, for watching live broadcast, authenticates users, and allocates closest media servers to the users based on locations of the users. |
| | Media server | Stores media streams sent by the content source and sends the media streams to a lower-level media server; or directly sends media streams to clients to provide services for users. |
| RDC | Web server | Responds to requests, from clients, for watching live broadcast, authenticates users, and allocates closest media servers to the users based on locations of the users. |
| | Media server | Stores the media streams (live broadcast content) sent by the upper-level media server and sends the media streams to a lower-level media server; or directly sends media streams to clients to provide services for users. |
| | Proxy server | Acts as a proxy for a video bearer protocol of users, identifies roles of users, initiates media stream requests to the media server, receives at least one live media stream sent by the media server, and sends, to the proxy client, only a live media stream requested by a client whose role is a master user. |
| Proxy client | | Acts as a proxy for a video bearer protocol of users, receives the live media stream that is of the client whose role is the master user and that is sent by the proxy server, duplicates the live media stream, and delivers the duplicated live media stream to another client that enters a live broadcast room through the proxy client. |
| Client PC | | Is a user that watches live broadcast. |

In addition, it should be noted that, in the system described in this embodiment of this application, the proxy server may correspond to one or more proxy clients. For example, the proxy server corresponds to a proxy client 1 and a proxy client 2. A client in a local area network 1 enters a live broadcast room through the proxy client 1 and the proxy server. A client in a local area network 2 enters the live broadcast room through the proxy client 2 and the proxy server. In addition, the proxy server may determine, in the following implementation A or implementation B, a role of each client that enters the live broadcast room through the proxy server.

Implementation A: Roles of all clients that enter the live broadcast room through a same proxy client are centrally determined. For example, the proxy server corresponds to the proxy client 1 and the proxy client 2. The proxy server determines at least one master user from clients that enter the live broadcast room through the proxy client 1, and determines the other clients as slave users; and determines at least one master user from clients that enter the live broadcast room through the proxy client 2, and determines the other clients as slave users. When determining the roles of the clients in the implementation A, correspondingly, the proxy server sends, to the proxy client, a live media stream of a client whose role is the master user, and then the proxy client sends the live media stream to all the clients that enter the live broadcast room through the proxy client. It can be understood that, when the implementation A is used to determine a role of a client, clients that enter the live broadcast room through each proxy client include a client whose role is the master user. A media stream that is sent by the proxy server to any proxy client is a media stream of the client whose role is the master user and that enters the live broadcast room.

Implementation B: Roles of all clients that enter the live broadcast room through the proxy server are centrally determined. For example, the proxy server corresponds to a proxy client 1 and a proxy client 2, and at least one master user is determined from all clients that enter the live broadcast room through the proxy client 1 and the proxy client 2, and the other clients are determined as slave users. When determining the roles of the clients in the implementation B, correspondingly, the proxy server sends a live media stream of a client whose role is the master user to each proxy client corresponding to the proxy server in the system, and then each proxy client sends the live media stream to all the clients that enter the live broadcast room through their respective proxy clients.

For ease of description, in the embodiments, a client whose role is a master user may be briefly referred to as a client serving as a master user. Similarly, a client whose role is a slave user may be briefly referred to as a client serving as a slave user.

Figure 3:
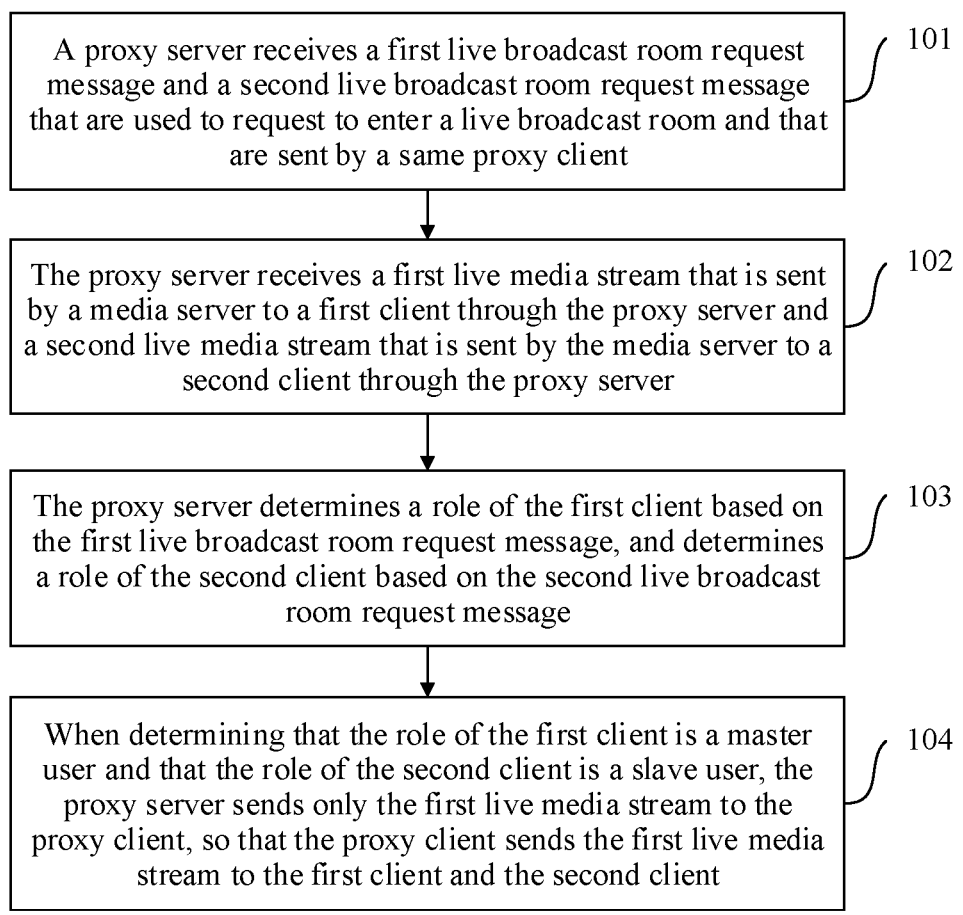
FIG. 3 is a flowchart of a media stream sending method according to an embodiment of this application.

Further, FIG. 3 shows a media stream sending method provided in an embodiment. The method provides a live media stream for all clients that enter a live broadcast room through a same proxy client. Further, the method includes the following steps.

Step 101: A proxy server receives a first live broadcast room request message and a second live broadcast room request message that are used to request to enter the live broadcast room and that are sent by the same proxy client, where the first live broadcast room request message is from a first client, and the second live broadcast room request message is from a second client.

The first live broadcast room request message includes an identifier of the proxy client, and the second live broadcast room request message includes the identifier of the proxy client, where the identifier may be an IP address, a port number, or the like of the proxy client. The proxy server can determine, based on the identifier of the proxy client included in the first live broadcast room request message, a proxy client that forwards the first live broadcast room request message; determine, based on the identifier of the proxy client included in the second live broadcast room request message, a proxy client that forwards the second live broadcast room request message; and further determine that the first live broadcast room request message and the second live broadcast room request message are from the same proxy client.

Step 102: The proxy server receives a first live media stream that is sent by a media server to the first client through the proxy server and a second live media stream that is sent by the media server to the second client through the proxy server.

Further, after receiving a first media request message sent by the first client, the proxy server forwards the first media request message to the media server, and receives the first live media stream that is sent by the media server based on the first media request message. After receiving a second media request message sent by the second client, the proxy server forwards the second media request message to the media server, and receives the second live media stream that is sent by the media server based on the second media request message.

Step 103: The proxy server determines a role of the first client based on the first live broadcast room request message, and determines a role of the second client based on the second live broadcast room request message.

Further, step 103 may be implemented in the foregoing "implementation A".

Further, in a possible implementation, in a technical scenario in which there is a single master user, each time the proxy server receives a live broadcast room request message (for example, the second live broadcast room request message), the proxy server determines whether there is a client, in live broadcast room, whose role is a master user in clients that enter the live broadcast room through the proxy client. If there is a client, in live broadcast room, whose role is a master user in clients that enter the live broadcast room through the proxy client, the proxy server determines that a role of a client (for example, the second client) that sends the live broadcast room request message is a slave user. If there is no client, in live broadcast room, whose role is a master user in clients that enter the live broadcast room through the proxy client, the proxy server determines that the role of the client is a master user.

In another possible implementation, in a technical scenario in which there are a plurality of master users, for example, there are one main-master user and at least one secondary-master user, step 103 further includes, each time the proxy server receives a live broadcast room request message (for example, the second live broadcast room request message), the proxy server determines whether a quantity of clients whose roles are master users and that enter the live broadcast room through the proxy client in the current live broadcast room reaches a preset upper limit, where the preset upper limit is greater than or equal to 2. If the quantity reaches the preset upper limit, the proxy server determines that a role of a client (for example, the second client) that sends the live broadcast room request message is a slave user. If the quantity does not reach the preset upper limit and the quantity is not 0, the proxy server determines that the role of the client is a secondary-master user. If the quantity is 0, the proxy server determines that the role of the client is a main-master user.

Further, step 103 may be implemented in the "implementation B", and a specific implementation is similar to the foregoing specific implementation of the "implementation A". In the technical scenario in which there is a single master user, in comparison with the "implementation A", an only difference lies in whether there is a client, in the live broadcast room, whose role is the master user and that enters the live broadcast room through the proxy server is a master user is determined. In the technical scenario in which there are a plurality of master users, in comparison with the "implementation A", an only difference lies in whether the quantity of clients whose roles are master users and that enter the live broadcast room through the proxy server in the live broadcast room reaches the preset upper limit is determined.

In addition, the method further includes the proxy server caches the first live media stream by groups of pictures (GOP). A GOP may refer to a picture sequence between two I frames. The I frame (frame) is also referred to as an intra picture, and generally refers to the first frame of each GOP obtained through moving picture experts group (MPEG) technology processing. Further, the MPEG technology processing includes appropriately compressing a video picture such that the I frame can be used as a reference for random access without referring to other pictures.

Optionally, the proxy server locally caches three GOPs, and duration of each GOP is 5 s.

Step 104: When determining that the role of the first client is a master user and that the role of the second client is a slave user, the proxy server sends only the first live media stream to the proxy client such that the proxy client sends the first live media stream to the first client and the second client.

Further, first, the proxy server receives the first live broadcast room request message in step 101, receives the first live media stream in step 102, and determines the role of the first client as the master user in step 103. Because the role of the first client is the master user, the proxy server sends a live media stream (that is, the first live media stream) of the first client to the proxy client in step 104. Correspondingly, the proxy client sends the first live media stream to the first client. Then, the proxy server receives the second live broadcast room request message in step 101, receives the second live media stream in step 102, and determines the role of the second client as the slave user in step 103. Because the role of the second client is the slave user and the second client and the first client correspond to the same proxy client, the proxy server does not send a media stream (that is, the second live media stream) of the second client to the proxy client. Correspondingly, after receiving the first live media stream sent by the proxy server, the proxy client not only sends the first live media stream to the first client, but also duplicates the first live media stream, and sends the duplicated first live media stream to the second client. It can be understood that, if there are more clients in the live broadcast room, the proxy client makes a plurality of copies of the first live media stream, and sends the copies of the first live media stream to all the clients that enter the live broadcast room through the proxy client.

It should be noted that, in the technical scenario in which there are a plurality of master users, the role of the first client may further be a main-master user, and the second client may be a slave user or a secondary-master user. When determining that the first client is the main-master user, regardless of whether the role of the second client is the slave user or the secondary-master user, the proxy server sends, to the proxy client, only the first live media stream that the first client requests to obtain.

In addition, if the proxy server corresponds to a plurality of clients, and a role of a client is determined in the foregoing "implementation B", the proxy server further correspondingly sends the first live media stream to another proxy client, and the other proxy client duplicates the received first live media stream and delivers a copy of the received first live media stream to a corresponding client.

In this embodiment, an example in which the "implementation A" is used to determine a role of a client is used for description in the following.

According to the method provided in this embodiment, when the second client whose role is the slave user requests to obtain a live media stream, the proxy client needs to send, to the second client, only the locally cached first live media stream that is requested by the first client whose role is the master user such that the proxy server does not need to send the live media stream to the proxy client again, and the proxy server does not need to send the live media stream to each client that enters the live broadcast room through the proxy client. This method reduces traffic for sending a media stream between the proxy server and the proxy client, effectively reduces egress bandwidth, and reduces resource overheads.

In addition, this embodiment further includes a process of changing a role of a client. Further, for the technical scenario in which there is a single master user, when the first client is the master user, and the second client is the slave user, the method further includes the proxy server receives a request message that is sent by the proxy client and that is for exiting the live broadcast room, where the request message for exiting the live broadcast room is used to request the first client to exit the live broadcast room; when determining the second client as a new master user, the proxy server changes the role of the second client from the slave user to a master user (slave-to-master), and the proxy server switches, to the second live media stream, the first live media stream that is sent to the proxy client such that the proxy client sends the second live media stream to clients (including the second client) that enter the live broadcast room through the proxy client.

Further, the last frame of the first live media stream that is sent by the proxy server to the proxy client and the first frame of the second live media stream that is sent by the proxy server to the second client are adjacent frames.

To ensure that the last frame and the first frame are adjacent frames, before the proxy server switches, to the second live media stream, the first live media stream that is sent to the second client, the method further includes a step of aligning media streams. The step of aligning media streams further includes the proxy server identifies, based on the first live media stream and the second live media stream, a first I frame and a second I frame that belong to the first live media stream and the second live media stream respectively, where the first I frame and the second I frame are a same video frame; and the proxy server determines, based on the first I frame and the second I frame, a first switching frame and a second switching frame that are adjacent to each other and that belong to the first live media stream and the second live media stream respectively, and uses the first switching frame and the second switching frame as the last frame of the first live media stream that is sent to the second client and the first frame of the second live media stream that is sent to the first client, respectively.

Further, after determining the first switching frame and the second switching frame, the proxy server forwards the request message, from the first client, for exiting the live broadcast room to the media server.

Similarly, in the technical scenario in which there are a plurality of master users, a process in which a corresponding client exits the live broadcast room includes, when the first client is the main-master user, and the second client is the slave user, the first client requests to exit the live broadcast room, the proxy server receives a request message for exiting the live broadcast room from the first client, and the proxy server determines to use the second client as a new secondary-master user, and changes the role of the second client from the slave user to a secondary-master user; and the proxy server receives, in real time, the second live media stream sent by the media server, and caches the second live media stream by GOPs. In this embodiment, for the client serving as the secondary-master user, the proxy server obtains the second live media stream of the secondary-master user, and locally caches the second live media stream such that the second live media stream can be directly used when the client whose role is the secondary-master user changes to the main-master user. This improves media stream transmission efficiency.

In addition, optionally, when the first client is the main-master user, and the second client is the secondary-master user, the procedure in which the first client exits the live broadcast room includes the proxy server receives, from the first client, a request message for exiting the live broadcast room; when determining to use the second client as a new main-master user, the proxy server changes the role of the second client from the secondary-master user to a main-master user (secondary-master to main-master), and switches, to the second live media stream, the first live media stream sent to the proxy client.

To improve media stream switching efficiency, each time the proxy server determines a new client whose role is a secondary-master user, the proxy server caches a received media stream of the client, and aligns the received media stream of the client and a media stream of the client whose role is the main-master user currently, to be specific, identifies, based on the media stream of the client whose role is the main-master user and the cached media stream of the client whose role is the secondary-master user, same video frames belonging to the two media streams. For example, before receiving the request message, from the first client, for exiting the live broadcast room, the proxy server caches the received second live media stream by GOPs; and identifies, based on the first live media stream and the second live media stream, the first I frame and the second I frame that belong to the first live media stream and the second live media stream respectively, where the first I frame and the second I frame are a same video frame. Further, after receiving the request message, from the first client, for exiting the live broadcast room, the proxy server determines, based on the first I frame and the second I frame, the first switching frame and the second switching frame that are adjacent and that belong to the first live media stream and the second live media stream respectively. The proxy server switches, to the second live media stream based on the first switching frame and the second switching frame, the first live media stream sent to the second client, where the last frame of the first live media stream sent to the second client is the first switching frame, and the first frame of the second live media stream sent to the first client is the second switching frame.

Figure 4:
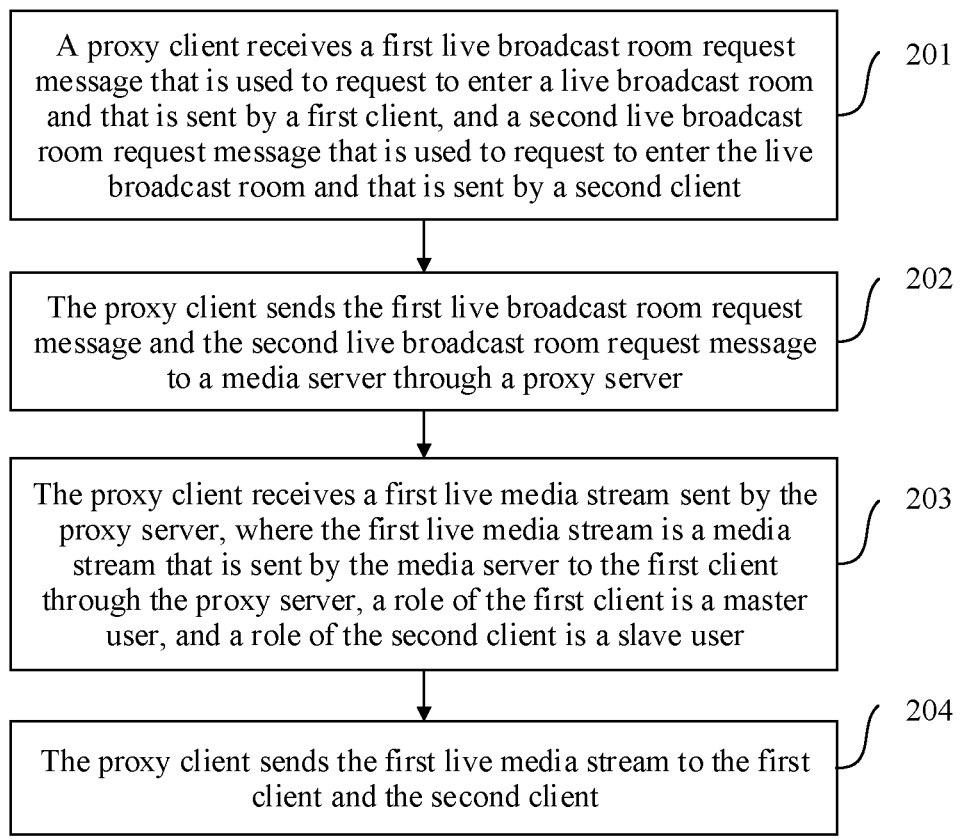
FIG. 4 is a flowchart of another media stream sending method according to an embodiment of this application.
Figure 5A:
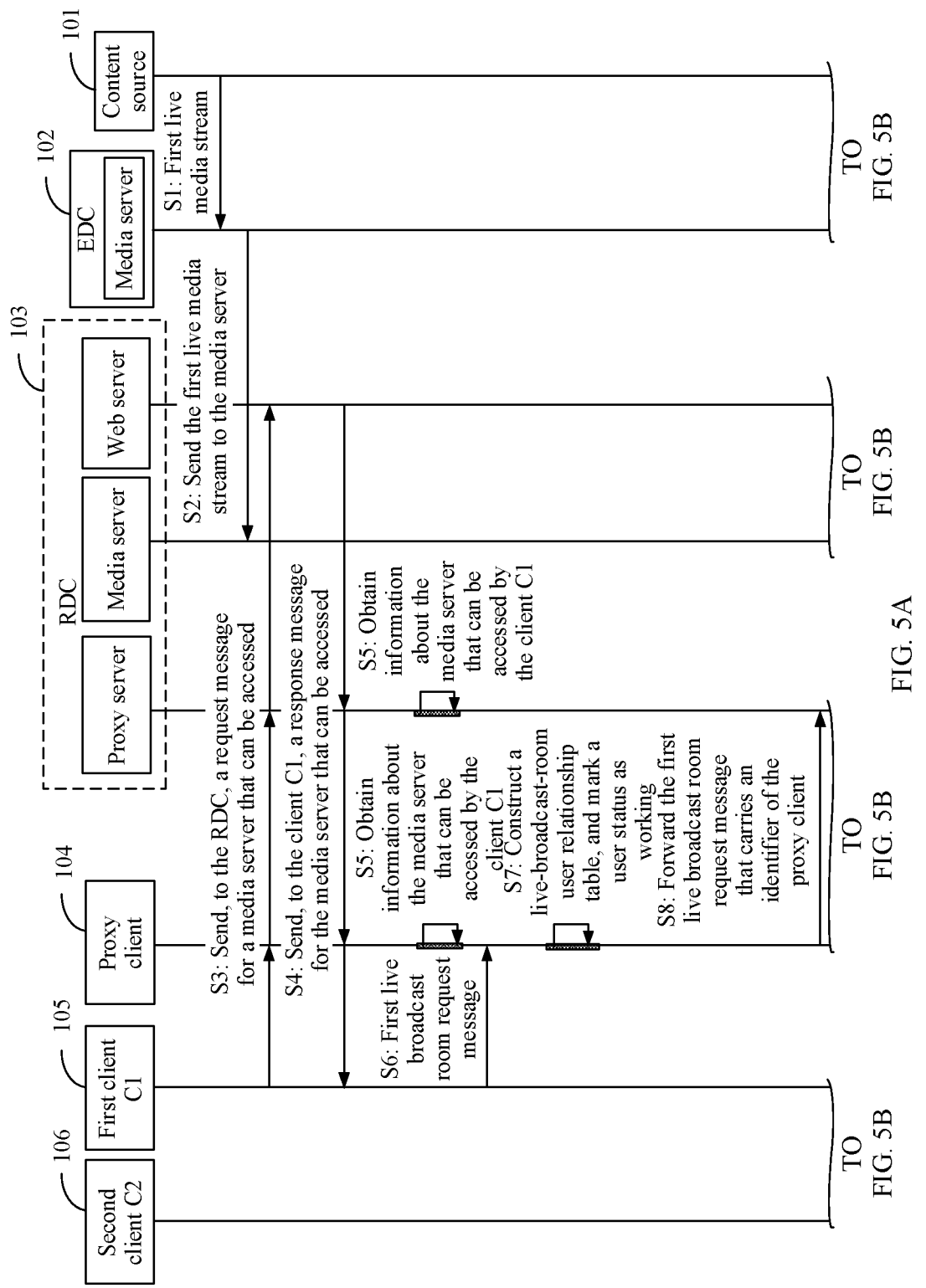
FIG. 5A to FIG. 5D are a signaling flowchart of a media stream sending method according to an embodiment of this application.
Figure 5B:
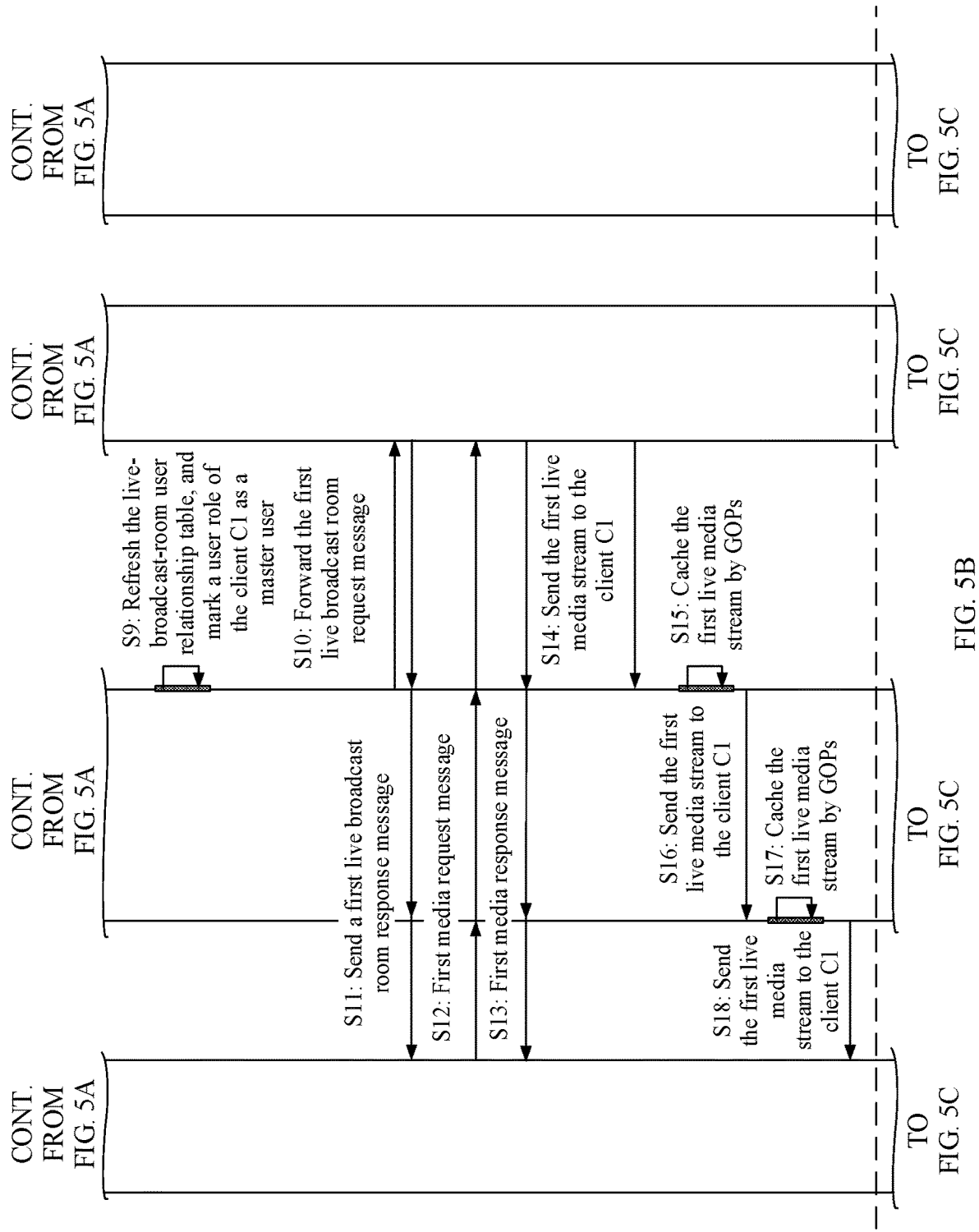
Figure 5C:
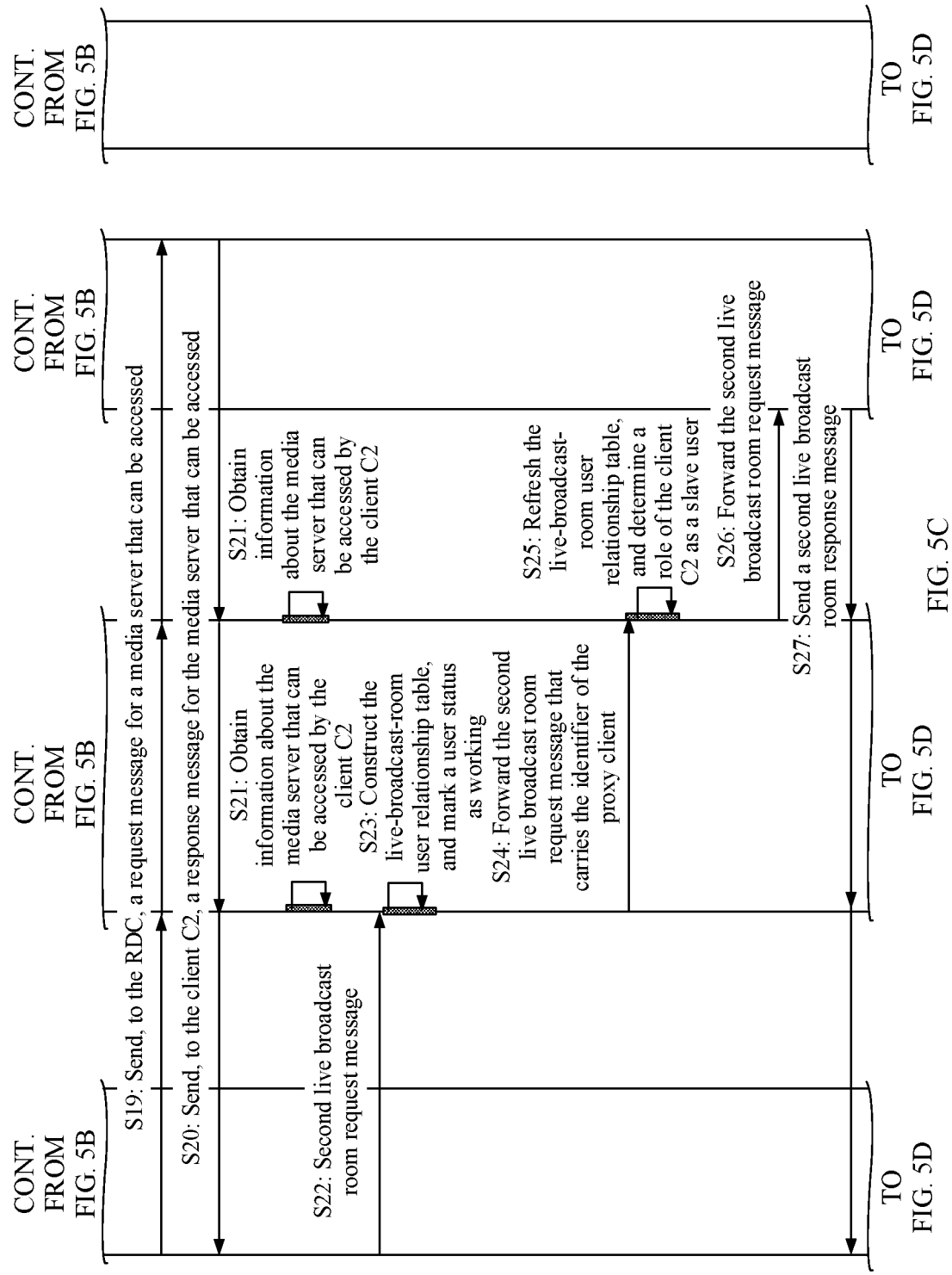
Figure 5D:
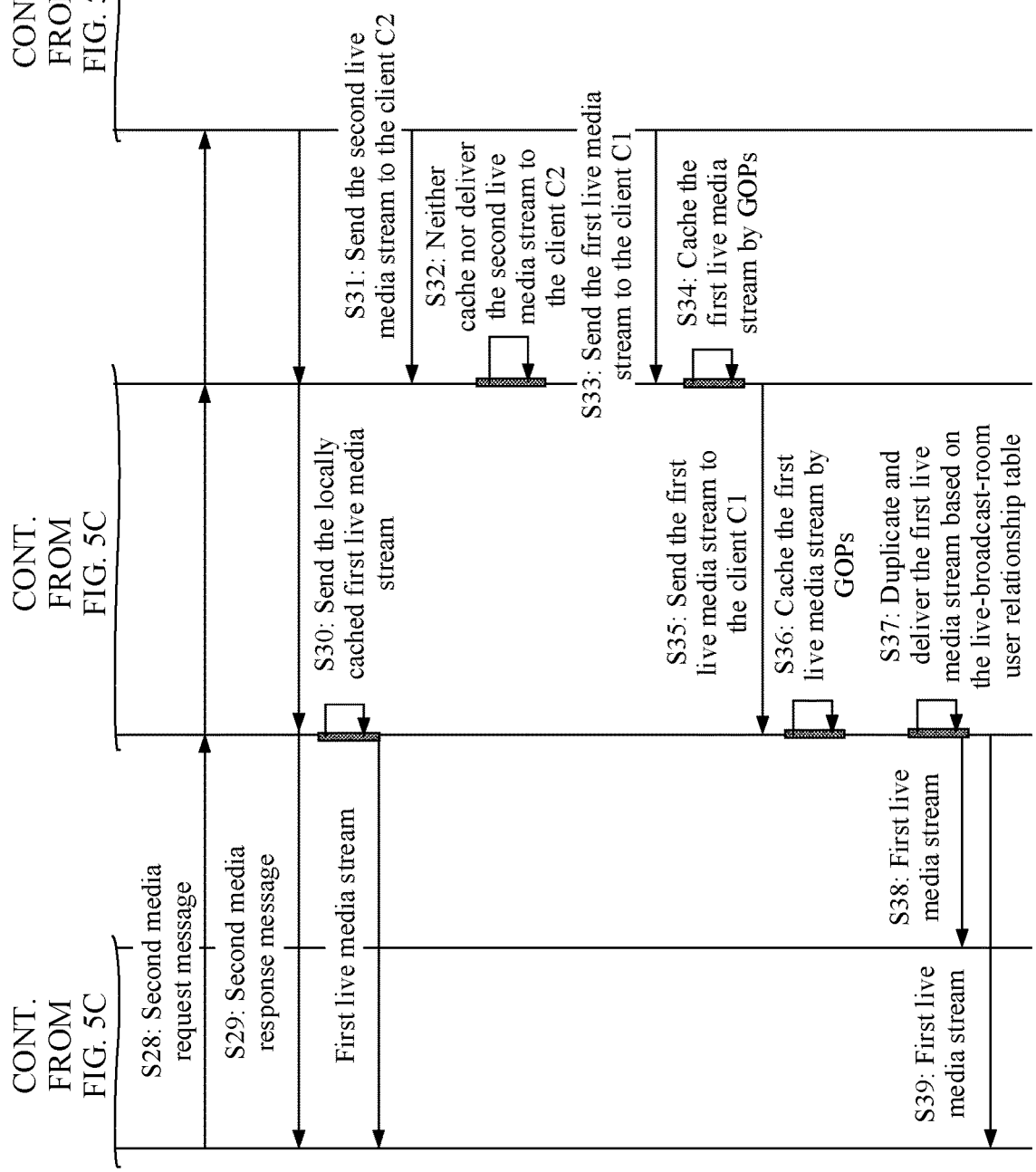

In addition, an embodiment of this application further provides a media stream sending method. The method may be applied to a proxy client. Further, as shown in FIG. 4, the method includes the following steps.

Step 201: A proxy client receives a first live broadcast room request message that is used to request to enter a live broadcast room and that is sent by a first client and a second live broadcast room request message that is used to request to enter the live broadcast room and that is sent by a second client.

Step 202: The proxy client sends the first live broadcast room request message and the second live broadcast room request message to a media server through a proxy server.

The proxy client may further add an identifier of the proxy client to the first live broadcast room request message before forwarding the first live broadcast room request message to the proxy server, and add the identifier of the proxy client to the second live broadcast room request message before forwarding the second live broadcast room request message to the proxy server. Optionally, the identifier of the proxy client is an IP address of the proxy client. Step 203: The proxy client receives a first live media stream sent by the proxy server, where the first live media stream is a media stream that is sent by the media server to the first client through the proxy server, a role of the first client is a master user, and a role of the second client is a slave user.

Step 204: The proxy client sends the first live media stream to the first client and the second client.

Before the proxy client sends the first live media stream, the method further includes the proxy client caches the first live media stream by GOPs, and adjusts a timestamp of the first live media stream.

Further, first, the proxy client receives the first live broadcast room request message of the first client in step 201, and forwards the first live broadcast room request message to the proxy server in step 202. Because the proxy server determines the first client as the master user, the proxy client receives a live media stream of the first client (that is, the first live media stream) in step 203, and sends the first live media stream to the first client in step 204.

Then, the proxy client receives the second live broadcast room request message of the second client in step 201, and forwards the second live broadcast room request message to the proxy server in step 202. Because the proxy server determines the second client as the slave user, the proxy client does not receive a live media stream (that is, the second live media stream) of the second client, but directly performs step 204 to duplicate the first live media stream and send the duplicated first live media stream to the second client. When duplicating the first live media stream and sending the duplicated first live media stream to the second client, the proxy client further adjusts the timestamp of the first live media stream such that the first live media stream sent to the second client satisfies that a timestamp of the first frame of the first live media stream that is sent by the proxy client to the second client is 0, and that timestamps of adjacent frames of the first live media stream that is sent to the second client are consecutive. "Consecutive" means that time lengths of adjacent frames of the first live media stream are the same, where the time length is a reciprocal of a frame rate f.

In addition, the method further includes a related procedure in which the proxy client forwards, when the first client exits the live broadcast room, a request message, from the first client, for exiting the live broadcast room further includes the proxy client receives, from the first client, the request message for exiting the live broadcast room, and sends the request message for exiting the live broadcast room to the proxy server; and receives a response message for exiting the live broadcast room that is sent by the proxy server based on the request message for exiting the live broadcast room, and sends the response message for exiting the live broadcast room to the first client.

The method further includes the proxy client marks a status of the first client as working when receiving the first live broadcast room request message; the proxy client marks a status of the second client as working when receiving the second live broadcast room request message; and the proxy client marks the status of the first client as exiting when receiving the request message, sent by the first client, for exiting the live broadcast room. In addition, the proxy client updates the status mark of the first client to the "live-broadcast-room user relationship table".

In addition, when the first client requests to exit the live broadcast room, the method further includes the proxy client receives a second live media stream sent by the proxy server, where the second live media stream is a media stream that is sent by the media server to the second client through the proxy client, and the second client is a client whose role changes from the slave user to a master user; and the proxy client sends the second live media stream to the second client.

Further, before the proxy client sends the second live media stream to the second client, the method further includes the proxy client adjusts a timestamp of the second live media stream such that an adjusted timestamp satisfies that a timestamp of the first frame of the second live media stream that is sent by the proxy client to the second client and the last frame of the first live media stream that is sent by the proxy client to the second client are consecutive. Further, the last frame of the first live media stream that is sent by the proxy client to the second client and the first frame of the second live media stream that is sent by the proxy client to the second client are adjacent frames.

Further, a process in which the proxy client adjusts a timestamp of a live media stream of a client (for example, the second client) in the live broadcast room includes adjusting the timestamp of the media stream according to Formula $y=x+\Delta t$, where y represents a timestamp after adjustment, x represents a timestamp before adjustment, and $\Delta t$ represents a time difference.

If the media stream is the $1^{st}$ channel of live media stream that is received after the client enters the live broadcast room, for example, in step 204, if the first live media stream is the $1^{st}$ channel of live media stream that is received after the second client enters the live broadcast room, the proxy server adjusts the timestamp of the media stream according to the formula such that an adjusted timestamp satisfies the following constraints.

1. A timestamp of the first frame of the live media stream that is sent by the proxy client to the second client is 0.

2. Timestamps of adjacent frames of the live media stream that is sent by the proxy client to the second client are consecutive, that is, time lengths of adjacent frames of the sent live video stream are the same, and the time length is a reciprocal of a frame rate f of the live video stream.

Because the live media stream is the $1^{st}$ channel of live media stream that is received after the second client enters the live broadcast room, $\Delta t$ represents an opposite number of the timestamp, before adjustment, of the first frame of the live media stream that is sent by the proxy client to the second client.

For example, in a scenario in which there are one master user and a plurality of slave users, it is assumed that a time length of a GOP of the first live media stream cached by the proxy client is 5 seconds (s), three GOPs are cached locally, and content of the three GOPs is updated in real time. If the first client (briefly referred to as a client C1) is a client that first enters the live broadcast room, the role of the client C1 at the $0^{th}$ second is the master user, and the client C1 continuously watches the first live media stream in the live broadcast room until the $60^{th}$ second arrives. In this case, three GOPs of the video media stream locally cached by the proxy client are as follows. Media content from the $45^{th}$ second to the $50^{th}$ second, media content from the $50^{th}$ second to the $55^{th}$ second, and media content from the $55^{th}$ second to the $60^{th}$ second. The three GOPs are segments of the media stream that are sent by the media server to the client C1 through the proxy server, and a timestamp of each correspondingly sent frame is relative time of the client C1.

The second client (briefly referred to as a client C2) enters the live broadcast room at the 60$^{th}$ second, and the role of the client C2 is the slave user. The proxy client needs to send, to the client C2, a latest first live media stream that is sent to the client C1 and that is locally cached. In this case, a live media stream closest to the 60$^{th}$ second is the media content of the third GOP segment, that is, the cached media content from the 55$^{th}$ second to the 60$^{th}$ second. The 55$^{th}$ second is a timestamp of a frame sent by the media server, and therefore a time difference that needs to be adjusted is $\Delta t=y-x=0-55=-55$ s, that is, the proxy client needs to reduce a timestamp by 55 seconds when sending the first live media stream to the client C2 in order to satisfy the foregoing constraints. In this way, each client C2 that enters the live broadcast room can watch the live broadcast video at the 0$^{th}$ second with no need to wait, and the client C1 and the client C2 in the live broadcast room can watch the video "synchronously".

Further, the method further includes when the client C1 requests to exit the live broadcast room, the proxy server needs to switch, to the second live media stream, the first live media stream that is sent to the client C2. In this case, the role of the client C2 is changed to a master user, and the second live media stream is a media stream that is sent by the media server to the client C2. Correspondingly, the proxy client receives the second live media stream sent by the media server, and adjusts a timestamp of the second live media stream.

For example, if the client C1 exits the live broadcast room at the 120$^{th}$ second of video playing, the proxy server determines to change the role of the client C2 to the master user. Then, the proxy server sends the second live media stream of the client C2 to the proxy client. The proxy client receives and caches the second live media stream. It is assumed that at the 120$^{th}$ second, media content of three GOPs locally cached by the proxy client is media content from the 105$^{th}$ second to the 110$^{th}$ second, media content from the 110$^{th}$ second to the 115$^{th}$ second, and media content from the 115$^{th}$ second to the 120$^{th}$ second. After 10 seconds elapse, a latest GOP 1 cached by the proxy client is the video content from the 115$^{th}$ second to the 120$^{th}$ second, and a timestamp of a frame in the GOP 1 is relative time of the client C1. After the client C1 exits the live broadcast room, the proxy client locally caches GOP 2 and GOP 3 media content from the 0th second to the 5$^{th}$ second and media content from the 5$^{th}$ second to the 10$^{th}$ second. Timestamps of the two GOPs are relative time of the client C2. Therefore, an adjusted time difference is calculated as $\Delta t=120-55-0=65$ s, that is, a timestamp of a frame of the second live media stream that is sent by the proxy client to the client C2 serving as the new master user needs to increase by 65 s.

In conclusion, when the proxy client adjusts a timestamp, there may be two cases for calculating a time difference. Details are as follows.

Case 1: If a client has not received a media stream, that is, if a current media stream is the Pt channel of media stream that is received by the client after the client enters the live broadcast room, the time difference is $\Delta t=0-t2=-t2$, where t2 represents a timestamp of the first frame of a media stream that is received by the proxy client from the proxy server and that needs to be forwarded to the client.

Case 2: If a client has received a media stream, that is, if a media stream that is sent by the proxy client to the client is switched from a media stream of a previous master user to a media stream of the current master user, a time difference is $\Delta t=+m)-t2$ where t2 represents a timestamp, before adjustment, of the first frame of a media stream (namely, the media stream of the current master user) that is sent by the proxy client to the client after media stream switching, and t1 represents a timestamp, after adjustment, of the last frame of a media stream (namely, the media stream of the previous master user) that is sent by the proxy client to the client before media stream switching. A timestamp of a corresponding next video frame is t1+m, and m=1/f. For example, f=20 fps, and a time length of a sent video frame is m=1 s/20=0.05 s, that is, 50 ms.

According to the method provided in this embodiment, when the proxy client and the proxy server obtain a live media stream requested by the client serving as the master user, some segments of the media stream are locally cached in the proxy client. When other clients enter the live broadcast room and request the live media stream, the proxy client directly sends the locally cached media stream to these clients such that the proxy server does not need to send the live media stream to the proxy client again. In this method, only the live media stream requested by the client serving as the master user is sent between the proxy server and the proxy client, in other words, wide area network bandwidth for transmitting only the live media stream is consumed. In comparison with transmission resources occupied when the media server sends the live media stream to each client through the proxy server, this reduces traffic for sending the media stream, reduces WAN network link load, and reduces resource overheads.

In addition, when the proxy client sends a live media stream to all the clients in the live broadcast room, the proxy client also adjusts a timestamp of the live media stream. For example, when the first client serving as the master user exits the live broadcast room, the proxy client switches, to the second live media stream, the first live media stream originally sent to the second client, and adjusts the timestamp of the second live media stream such that when the proxy client sends the second live media stream to the second client, the second live media stream can be seamlessly connected to media content of the first live media stream that is originally being played. This avoids video freeze or other impacts, caused by exiting of the first client, on media content watched on the second client. Therefore, according to this method, adjusting the timestamp by the proxy client also ensures user experience of watching.

The following further describes the method provided in the embodiments of this application.

Embodiment 1

This embodiment provides a live video media stream sending method. The method may be applied to the video live broadcast system shown in FIG. 2. The method includes a proxy server provides a live media stream for a first client and a second client that enter a live broadcast room through a same proxy client, where the live media stream comes from a content source and is forwarded by a media server in an RDC. Further, as shown in FIG. 5A to FIG. 5D, the method includes a total of 39 steps (step "S" 1 to S39): S1 to S39.

S1 to S18 are a process in which the first client (which is referred to as a "client C1" hereinafter) enters the live broadcast room and obtains a live media stream. S19 to S39 are a process in which the second client (which is referred to as a "client C2" hereinafter) enters the live broadcast room and obtains a live media stream.

Further, the process in which the client C1 enters the live broadcast room and obtains the live media stream includes the following steps.

S1: The content source sends a first live media stream to a media server in an EDC.

S2: The media server in the EDC receives the first live media stream, and sends the first live media stream to a media server in a lower-level RDC. Before the first live media stream is sent, the method further includes a step in which a web server in the EDC authenticates the media server in the lower-level RDC, and the media server in the EDC sends the first live media stream to the media server in the lower-level RDC only when authentication succeeds.

Optionally, S2 further includes the proxy server identifies, based on a service feature of the first live media stream, a transmission protocol corresponding to a client served by the proxy server. The service feature includes an IP address and a port number that are of the web server. For example, for a hypertext transfer protocol (HTTP), a service feature that can be configured includes the IP address and the port number that are of the web server. Further, the proxy server may further determine that a transmission protocol corresponding to the HTTP protocol is a transmission control protocol (TCP), for media stream transmission.

S3: The client C1 sends, to a web server in the RDC, a request message for a media server that can be accessed by the client C1. Further, the request message includes information such as a user name and an IP address that are of the client C1, a name of the live broadcast room, and a key token obtained after the client C1 is successfully authenticated, where the IP address is used to determine a location of the client C1. Further, the client C1 sends the request message to a proxy client, the proxy client forwards the request message to the proxy server after receiving the request message, and the proxy server forwards the request message to the web server in the RDC.

S4: The web server in the RDC receives the request message, and sends, to the client C1, a response message for the media server that can be accessed by the client C1, where the response message is used to notify the client C1 of the media server that can be accessed by the client C1. Further, the web server determines, based on the request message, a target media server capable of providing a media stream service for the client C1, where the target media server is one of a plurality of media servers in the RDC; and then sends the response message to the client C1, where the response message includes related information of the target media server, for example, uniform resource locator (URL) information, an IP address, and a port number that are of the target media server.

Further, the web server in the RDC sends the response message to the proxy server, the proxy server sends the response message to the proxy client, and the proxy client forwards the response message to the client C1.

The web server determines the location of the client C1 based on the IP address carried in the request message, sent by the client C1, that is for the media server that can be accessed by the client C1; and selects a media server closest to the client C1 as the target media server based on the location information.

S5: The response message carries the related information of the target media server, for example, the URL information, the IP address, and the port number that are of the target media server. Therefore, when forwarding the response message, the proxy server and the proxy client obtain information about the media server that can be accessed by the client C1, that is, the proxy server and the proxy client obtain the related information of the target media server.

S6: The client C1 sends, to the proxy client, a first live broadcast room request message for requesting to enter the live broadcast room, where the first live broadcast room request message indicates that the client C1 requests to enter the live broadcast room. The first live broadcast room request message includes the user name, the IP address, and a port number that are of the client C1, the name of the live broadcast room, the token obtained after authentication succeeds, and the like.

S7: The proxy client receives the first live broadcast room request message sent by the client C1, and sets a status of the client C1 to a working state. The proxy client also constructs a "live-broadcast-room user relationship table", and adds an entry about the client C1 to the live-broadcast-room user relationship table. Further, content of the entry includes information such as the IP address, the port number, the user status, and the user name that are of the client C1, the IP address and the port number that are of the selected target media server in the RDC, and the name of the live broadcast room. The user status of the client C1 is working. The IP address of the client C1 may be a primary key stored in a database.

In addition, the method further includes the proxy client adds an identifier of the proxy client to the first live broadcast room request message, where the identifier of the proxy client is an IP address, a port number, or the like of the proxy client.

S8: The proxy client sends, to the proxy server, the first live broadcast room request message to which the identifier of the proxy client is added, where the modified first live broadcast room request message includes information such as the identifier of the proxy client, the user name of the client C1, the name of the live broadcast room, and the token obtained after authentication succeeds.

S9: The proxy server receives the modified first live broadcast room request message, determines a role of the client C1 based on the first live broadcast room request message, and refreshes the live-broadcast-room user relationship table. Further, the determining a role of the client C1 includes, when receiving the first live broadcast room request message, determining whether there is a client whose role is a master user in clients that enter the live broadcast room through the proxy client; and if there is a client whose role is a master user in clients that enter the live broadcast room through the proxy client, determining that the client C1 is a slave user, or if there is no client whose role is a master user in clients that enter the live broadcast room through the proxy client, determining that the client C1 is a master user. In this embodiment, because the client C1 is a user that first enters the live broadcast room through the proxy client, there is no master user. Therefore, when receiving the first live broadcast room request message, the proxy server determines that the role of the client C1 is the master user, and identifies the role of the client C1 as the master user.

In addition, the method further includes, after determining the role of the client C1, the proxy server refreshes the "live-broadcast-room user relationship table", and marks the role of the client C1 as the master user. Understandably, the proxy server may update the "live-broadcast-room user relationship table" in real time based on a received live broadcast room request message sent through the same proxy client in order to record a role and a state of each client in the live broadcast in real time. Optionally, the proxy server further records the identifier (the IP address and the port number) of the proxy client in the "live-broadcast-room user relationship table".

In this embodiment, a quantity of clients whose roles are master users in the live broadcast room is set to 1. In other words, there is only one master user in the live broadcast room and other clients are slave users. This technical scenario may be referred to as a scenario in which there is a single master user.

S10: The proxy server sends the first live broadcast room request message to the media server in the RDC. The first live broadcast room request message does not include the identifier of the proxy client.

Step S9 may be performed before step S10 or step S9 may be performed after step S10. This is not strictly limited in this embodiment.

S11: The media server in the RDC receives the first live broadcast room request message, and sends a first live broadcast room response message to the client C1. The first live broadcast room response message is used to notify the client C1 that the client C1 successfully enters the live broadcast room. Further, first, the media server forwards the first live broadcast room response message to the proxy client through the proxy server, and then the proxy client forwards the first live broadcast room response message to the client C1.

S12: The client C1 sends a first media request message to the proxy client, where the first media request message is used to request to obtain a first live media stream from the media server. Optionally, the first media request message carries a first identifier of the client C1, where the first identifier is used to uniquely identify the client C1. In this embodiment, the first identifier includes the IP address, the user name, and the like that are of the client C1.

Further, after receiving the first media request message, the proxy client forwards the first media request message to the proxy server, and the proxy server sends the first media request message to the media server in the RDC.

S13: After receiving the first media request message, the media server sends a first media response message to the client C1. The first media response message is used to notify the client C1 that the client C1 is allowed to obtain the first live media stream. Further, the media server sends the first media response message to the proxy server, the proxy server forwards the first media response message to the proxy client, and finally the proxy client forwards the first media response message to the client C1.

S14: The media server sends the first live media stream to the proxy server.

S15: The proxy server obtains, in real time, the first live media stream sent by the media server, and then locally caches the first live media stream. Further, the proxy server locally caches segments of the first live media stream by GOPs, for example, caches media stream segments of three latest GOPs: t1-t2, t2-t3, and t3-t4.

S16: The proxy server sends the cached segments of the first live media stream to the proxy client such that the proxy client sends the first live media stream to the client C1.

S17: The proxy client receives the first live media stream sent by the proxy server, and locally caches the first live media stream by GOPs. The proxy client caches only several latest segments of the first live media stream.

S18: The proxy client sends the cached first live media stream to the client C1.

Optionally, in the process in which the proxy client sends the first live media stream to the client C1, the proxy client further needs to adjust a timestamp of the first live media stream such that an adjusted timestamp satisfies that a timestamp of the first frame of the first live media stream that is sent by the proxy client to the client C1 is 0, and that timestamps of adjacent frames of the first live media stream that is sent to the client C1 are consecutive. "Consecutive" means that time lengths of adjacent video frames of the first live media stream received by the client C1 are the same, where the time length is a reciprocal of a frame rate f.

The following describes the method for which the client C2 enters the live broadcast room and obtains the live media stream. Further, the following steps are included.

S19: The client C2 sends, to the web server in the RDC, a request message for a media server that can be accessed by the client C2, where the request message includes information such as a user name and an IP address that are of the client C2, the name of the live broadcast room, and a key token obtained after the client C2 is successfully authenticated. Further, the client C2 forwards the request message to the web server in the RDC through the proxy client and the proxy server. In the forwarding process, the proxy client and the proxy server both obtain the information carried in the request message.

S20: The web server in the RDC receives the request message, and sends a response message to the client C2, where the response message is used to notify the client C2 of the media server that can be accessed by the client C2. This is the same as the foregoing step S4. The web server selects one of the plurality of media servers to provide a media stream service for the client C2, and sends related information of the selected media server to the proxy server and the proxy client through the response message. For example, the related information of the selected media server includes URL information, an IP address, and a port number that are of the selected media server.

S21: In a process of forwarding the response message, the proxy client and the proxy server obtain information carried in the request message, where the information includes the information about the media server that can be accessed by the client C2. For example, the information includes the IP address and the port number that are of the media server.

S22: The client C2 sends, to the proxy client, a second live broadcast room request message for requesting to enter the live broadcast room, where the second live broadcast room request message indicates that the client C2 requests to enter the live broadcast room. The second live broadcast room request message includes the user name, the IP address, and a port number that are of the client C2, the name of the live broadcast room, the token obtained after authentication succeeds, and the like.

S23: The proxy client receives the second live broadcast room request message sent by the client C2, and sets a status of the client C2 to a working state. The proxy client also adds an entry about the client C2 to the "live-broadcast-room user relationship table". Further, content of the entry includes information such as the IP address, the port number, the user status, and the user name that are of the client C2, the IP address and the port number that are of the selected target media server in the RDC, and the name of the live broadcast room. The user status of the client C2 is working. The IP address of the client C2 may be a primary key stored in the database.

In addition, the method further includes the proxy client adds the identifier of the proxy client to the second live broadcast room request message, where the identifier of the proxy client is the IP address, the port number, or the like of the proxy client.

S24: The proxy client sends, to the proxy server, the second live broadcast room request message to which the identifier of the proxy client is added. The modified second live broadcast room request message includes information such as the identifier of the proxy client, the user name of the client C2, the name of the live broadcast room, and the token obtained after authentication succeeds.

S25: The proxy server receives the modified second live broadcast room request message sent by the proxy client, determines a role of the client C2 based on the second live broadcast room request message, and refreshes the live-broadcast-room user relationship table. Further, a possible implementation is that, after receiving the second live broadcast room request message, the proxy server determines whether there is a client, in the live broadcast room, whose role is a master user in the live broadcast room in clients that enter the live broadcast room through the proxy client; and if there is a client, in the live broadcast room, whose role is a master user in the live broadcast room in clients that enter the live broadcast room through the proxy client, the proxy server determines that the role of the client C2 is a slave user. In this embodiment, there is the client C1 whose role is the master user in the live broadcast room currently, and therefore the role of the client C2 is determined as the slave user.

In addition, S25 further includes the proxy server refreshes the "live-broadcast-room user relationship table", and identifies the role of the client C2 as the slave user. In addition, the method further includes the proxy server adds the identifier of the proxy client, for example, the IP address and the port number that are of the proxy client, to the entry about the client C2.

S26: The proxy server sends the second live broadcast room request message to the media server in the RDC. The second live broadcast room request message does not include the identifier of the proxy client.

S27: The media server receives the second live broadcast room request message, and sends a second live broadcast room response message to the client C2, where the second live broadcast room response message is used to notify the client C2 that the client C2 successfully enters the live broadcast room. Further, the media server sends the second live broadcast room response message to the proxy server and the proxy client, and then the proxy client forwards the second live broadcast room response message to the client C2.

S28: The client C2 sends a second media request message to the proxy client, where the second media request message is used to request to obtain a live media stream from the media server. Optionally, the second media request message carries a second identifier of the client C2, where the second identifier is used to uniquely identify the client C2. In this embodiment, the second identifier includes the IP address, the user name, and the like that are of the client C2.

Further, after receiving the second media request message, the proxy client forwards the second media request message to the proxy server, and the proxy server sends the second media request message to the media server in the RDC.

S29: After receiving the second media request message, the media server sends a second media response message to the client C2, where the second media response message is used to notify the client C2 that the client C2 is allowed to obtain the first live media stream. Further, the media server sends the second media response message to the proxy server, the proxy server forwards the second media response message to the proxy client, and finally the proxy client forwards the second media response message to the client C2.

S30: The proxy client sends the locally cached first live media stream to the client C2, and further adjusts a timestamp of the first live media stream when sending the first live media stream such that an adjusted timestamp satisfies that a timestamp of the first frame of the first live media stream that is sent by the proxy client to the client C2 is 0, and that timestamps of adjacent frames of the first live media stream that is sent to the client C2 are consecutive.

S31: The media server sends a second live media stream to the proxy server, where the second live media stream is a media stream that is sent to the client C2, and the role of the client C2 is the slave user.

S32: After receiving the second live media stream, the proxy server neither caches the second live media stream nor forwards the second live media stream to the client C2, because the second live media stream is a media stream sent to the client C2 serving as the slave user.

S33: The media server sends the first live media stream to the proxy server in real time.

S34: After receiving the first live media stream sent by the media server, the proxy server locally caches segments of the first live media stream by GOPs. In this embodiment, the proxy server locally caches three GOPs, and may further cache more or fewer GOPs. This is not limited in this embodiment.

S35: The proxy server sends the first live media stream to the proxy client.

S36: The proxy client receives the first live media stream, and locally caches the segments of the first live media stream by GOPs.

S37: The proxy client determines, based on content of entries in the "live-broadcast-room user relationship table", a quantity of clients serving as master users and a quantity of clients serving as slave users, and duplicates the cached segments of the first live media stream segment, to prepare to send the segments to clients in the live broadcast room. In this embodiment, there are only two clients in the live broadcast room currently namely the client C1 and the client C2, where the client C1 is the master user, and the client C2 is the slave user. Therefore, the proxy client makes one copy of the first live media stream in order to prepare to send the copy of the first live media stream to the client C2.

S38: The proxy client sends the locally cached first live media stream to the client C1. In addition, the method further includes the proxy client adjusts the timestamp of the first live media stream based on a time point at which the client C1 receives a video frame of the media stream.

S39: The proxy client sends the locally cached first live media stream to the client C2. In addition, the method further includes the proxy client adjusts the timestamp of the first live media stream based on a time point at which the client C2 receives a video frame of the media stream.

In addition, the proxy client adjusts a timestamp of a video frame watched by a user that enters the live broadcast room such that the client C1 and the client C2 in the live broadcast room can "synchronously" watch media content of the first live media stream, thereby improving user experience.

According to the method of this embodiment, when the proxy client and the proxy server obtain the live media stream requested by the first client serving as the master user, the proxy client locally caches some segments of the live media stream. When the second client enters the live broadcast room and requests a live media stream, the proxy client directly sends the locally cached live media stream to the second client such that the proxy server does not need to send the live media stream to the proxy client again. According to the method, the proxy server needs to send only one live media stream to the proxy client, in other words, wide area network bandwidth for transmitting the only one live media stream is consumed. This can effectively reduce traffic for sending live media streams, reduces WAN network link load, and reduces resource overheads.

In addition, according to the method of this embodiment, the first live broadcast room request message and the first media request message that are of the client C1 may be combined into one message, and the combined message has functions of the first live broadcast room request message and the first media request message. Therefore, when determining the role of the client C1, the proxy server may calculate, based on a quantity of first media request messages, a quantity of clients serving as master users that enter the live broadcast room currently. Similarly, the second live broadcast room request message and the second media request message that are of the client C2 may also be combined into one message, and a corresponding method for determining the role of the client C2 is the same. Details are not described again in this embodiment.

Figure 6A:
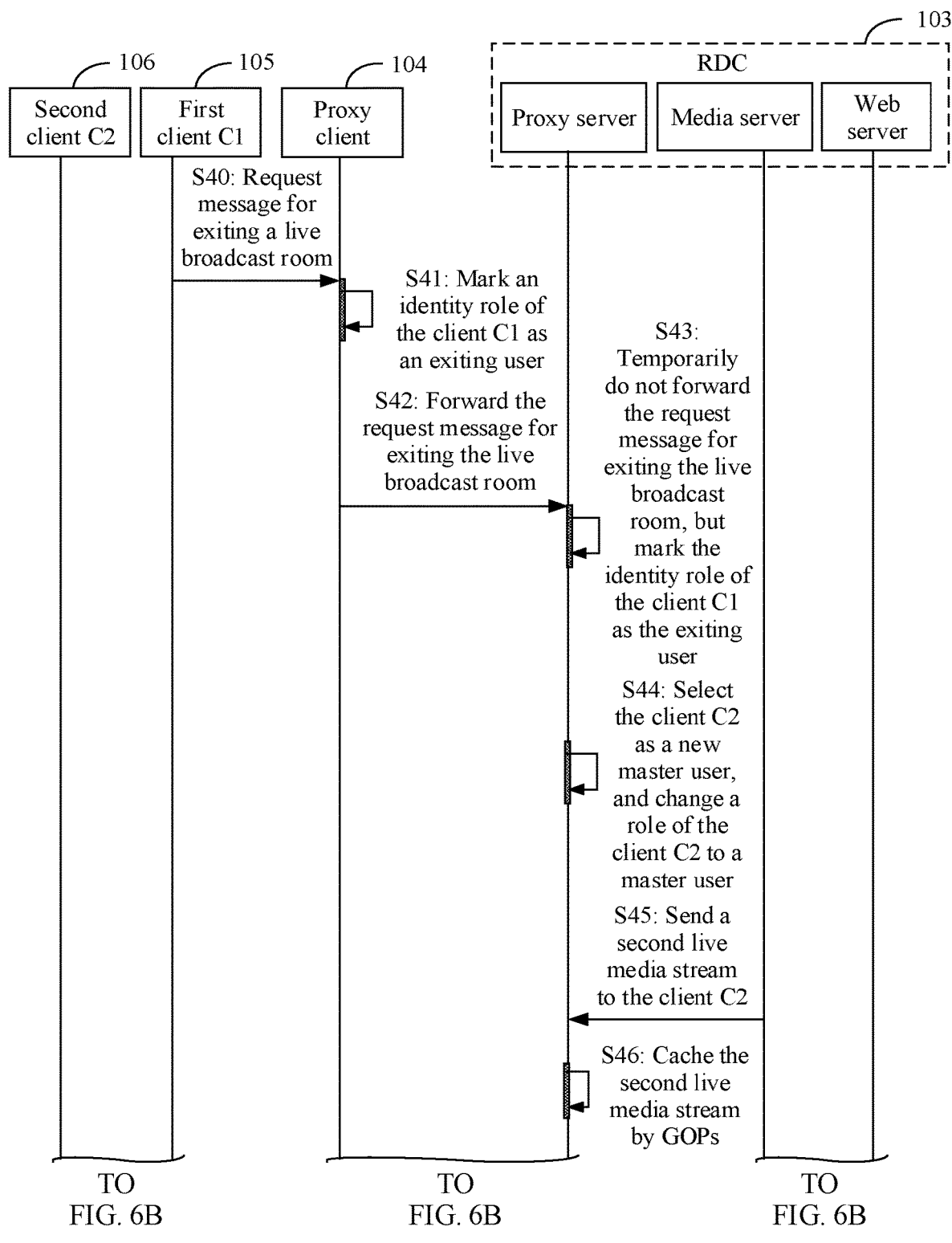
FIG. 6A and FIG. 6B are a signaling flowchart of another media stream sending method according to an embodiment of this application.
Figure 6B:
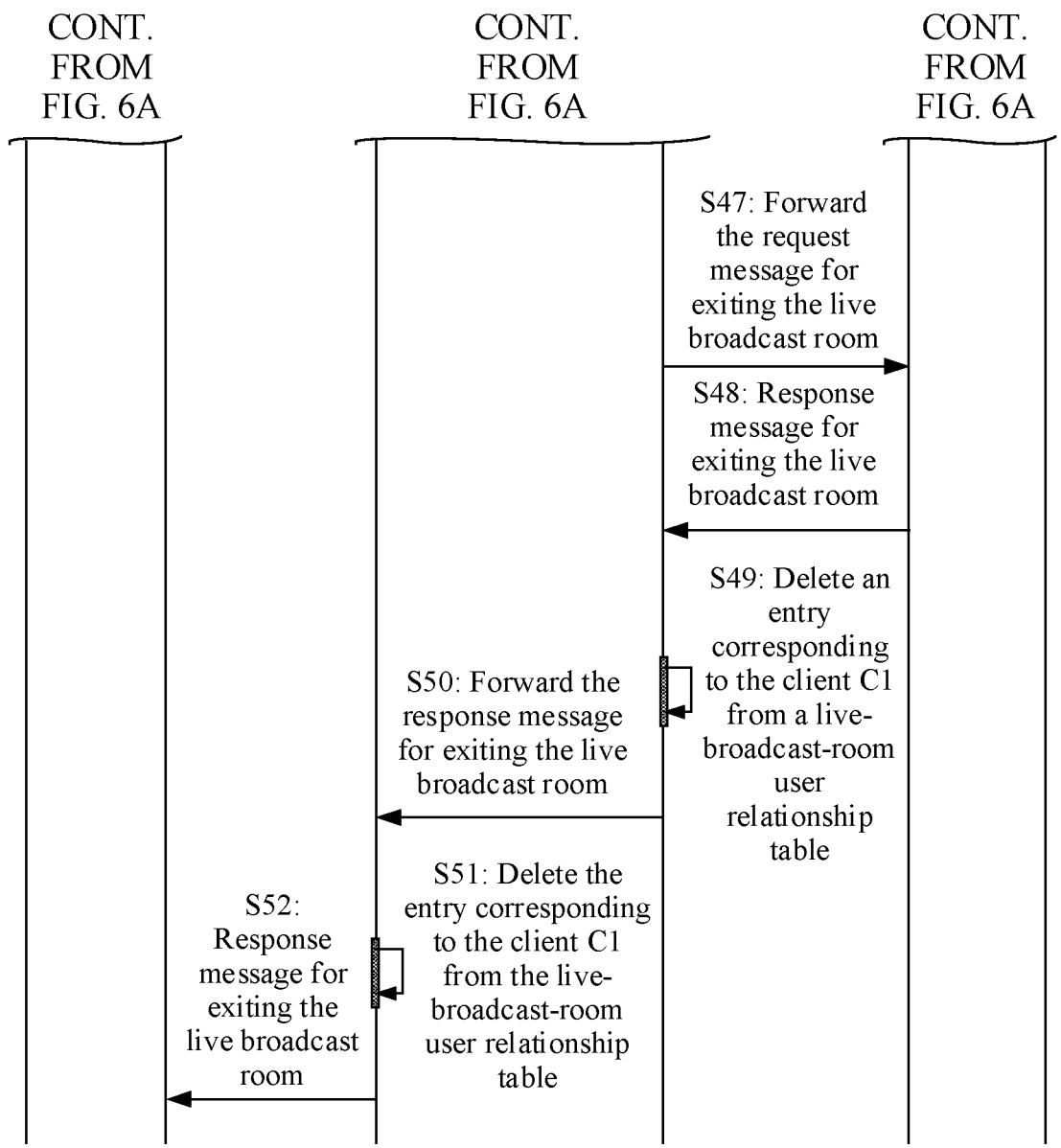

In addition, the method provided in this embodiment further includes a process in which the media server continues to send a live media stream to the client C2 when the role of the client C2 changes, for example, from the role of the slave user to a role of a master user. Further, as shown in FIG. 6A and FIG. 6B, S40 to S52 are included. A specific method procedure is as follows.

S40: The client C1 sends a request message for exiting the live broadcast room to the proxy client, where the request message for exiting the live broadcast room is used to request the client C1 to exit the live broadcast room. The request message for exiting the live broadcast room includes information such as the user name, the IP address, the port number, and the user role that are of the client C1, and the name of the live broadcast room.

S41: After receiving the request message for exiting the live broadcast room, the proxy client marks the status of the client C1 as an exiting user, and records the role of the exiting user in the "live-broadcast-room user relationship table".

S42: The proxy client sends the request message for exiting the live broadcast room to the proxy server.

S43: After receiving the request message for exiting the live broadcast room, the proxy server temporarily does not forward, to the media server, the request message for exiting the live broadcast room, because the first live media stream requested by the client C1 serving as the master user is being watched by the client C2 at this time. In addition, the status of the client C1 is marked as the exiting user, and is recorded in the "live-broadcast-room user relationship table".

S44: The proxy server selects one client from the clients in the live broadcast room as a new master user. In this embodiment, there are only the client C1 and the client C2 that enter the live broadcast room through the proxy client. When the client C1 requests to exit the live broadcast room, the proxy server selects the client C2 as the new master user, changes the role of the client C2 from the slave user to the master user, and also marks the client C2 as a slave-to-master user.

S45: The media server sends the second live media stream to the proxy server in real time. Content of the second live media stream is the same as content of the first live media stream, and both the second live media stream and the first live media stream are from the content source.

S46: The proxy server receives the second live media stream, and locally caches the second live media stream by GOPs.

In addition, the method further includes the proxy server aligns the first live media stream and the second live media stream according to an alignment algorithm. Further, the alignment process includes each time the proxy server receives an I frame of the first live media stream, the proxy server compares the I frame with an I frame of the locally cached second live media stream; and each time the proxy server receives an I frame of the second live media stream, the proxy server compares the I frame with an I frame of the locally cached first live media stream. If the proxy server finds, through the foregoing comparison, an I frame belonging to the first live media stream and an I frame belonging to the second live media stream (which are referred to as an I frame a and an I frame b hereinafter), where the two I frames have same media content, the proxy server determines that the two live media streams are aligned. It can be understood that the I frame a and the I frame b are a same video frame. Further, the proxy server determines switching points based on the I frame a and the I frame b. To be specific, the proxy server determines the last frame (which is referred to as a switching frame x hereinafter) of the first live media stream that is sent to the proxy client and the first frame (which is referred to as a switching frame y hereinafter) of the second live media stream that is sent to the proxy client, where the switching frame x and the switching frame y are adjacent frames. Further, the proxy server may determine the $n^{th}$ frame after the I frame a in the first live media stream as the switching frame x, and determine the $(n+1)^{th}$ frame after the I frame b in the second live media stream as the switching frame y, where n is an integer greater than or equal to 0. Because the I frame a and the I frame b are a same video frame, the nth frame after the I frame a and the (n+1)th frame after the I frame b are naturally adjacent frames.

In this embodiment, when the client C1 whose role is the master user exits the live broadcast room, the client C2 serving as the new master user is used to request and obtain the second live media stream. The Ith frame of the first live media stream and the Ith frame of the second live media stream are aligned such that the proxy server seamlessly switches, when sending the second live media stream to the proxy client, from media content of the first live media stream media that is originally being played to the second live media stream. In this way, for users in the live broadcast room, there are no repeatedly played parts and played content is integral when the proxy server switches the live media stream.

S47: The proxy server sends the request message for exiting the live broadcast room to the media server.

S48: After receiving the request message for exiting the live broadcast room, the media server sends, to the proxy server, a response message for exiting the live broadcast room, where the response message for exiting the live broadcast room is used to notify the client C1 that the client C1 successfully exits the live broadcast room.

S49: The proxy server deletes the entry corresponding to the client C1 from the "live-broadcast-room user relationship table".

S48 may be performed before S49, or S48 may be performed after S49. This is not strictly limited.

S50: The proxy server receives the response message, sent by the media server, for exiting the live broadcast room, and forwards the response message for exiting the live broadcast room to the proxy client.

S51: The proxy client receives the response message, sent by the proxy server, for exiting the live broadcast room, and deletes the entry corresponding to the client C1 from the "live-broadcast-room user relationship table".

S52: The proxy client sends the response message for exiting the live broadcast room to the client C1.

In addition, the method further includes the proxy server sends, to the proxy client, the second live media stream cached in the proxy server; and the proxy client locally caches the second live media stream by GOPs after receiving the second live media stream, and then sends segments of the cached second live media stream to the client C2, to ensure that the client C2 in the live broadcast room can normally watch live media content. In addition, when sending the second live media stream to the client C2, the proxy client adjusts a timestamp of the second live media stream such that a timestamp of the first frame of the second live media stream received by the client C2 and a timestamp of the last frame of the first live media stream are consecutive, where a corresponding time length is a reciprocal of the frame rate parameter f. For the specific adjustment process, refer to the descriptions in the foregoing embodiment. Details are not described herein again.

According to the method provided in this embodiment, when the client serving as the master user exits the live broadcast room, the proxy server selects a new client from the clients in the live broadcast room as the new master user, performs alignment on the live media stream of the new master user, and sends the live media stream to the proxy client. After receiving the live media stream that is of the new master user and that is sent by the proxy server, the proxy client adjusts a timestamp of the live media stream such that other users watching media content in the live broadcast room are unaware of the switching of the media stream. This method ensures user experience of watching in the live broadcast room.

Embodiment 2

This embodiment provides another live media stream sending method, and the method is applied to a technical scenario in which there are a plurality of master users. The plurality of master users indicates that a specified quantity of clients in a live broadcast room whose roles are master users is greater than or equal to 2. Further, the plurality of master users include one main-master user and a plurality of secondary-master users, and may further include at least one slave user, where the main-master user may be identified as a main-master user, and the secondary-master users may be identified as secondary-master users. Further, in this method, a process in which clients that enter a live broadcast room through a same proxy client request and obtain a live media stream is similar to the process described in the foregoing Embodiment 1, but differences are as follows. Identifying roles of clients; and when a client whose role is a master user exits the live broadcast room, identifying roles of clients that are still in the live broadcast and duplicating and delivering of a live media stream.

Figure 7A:
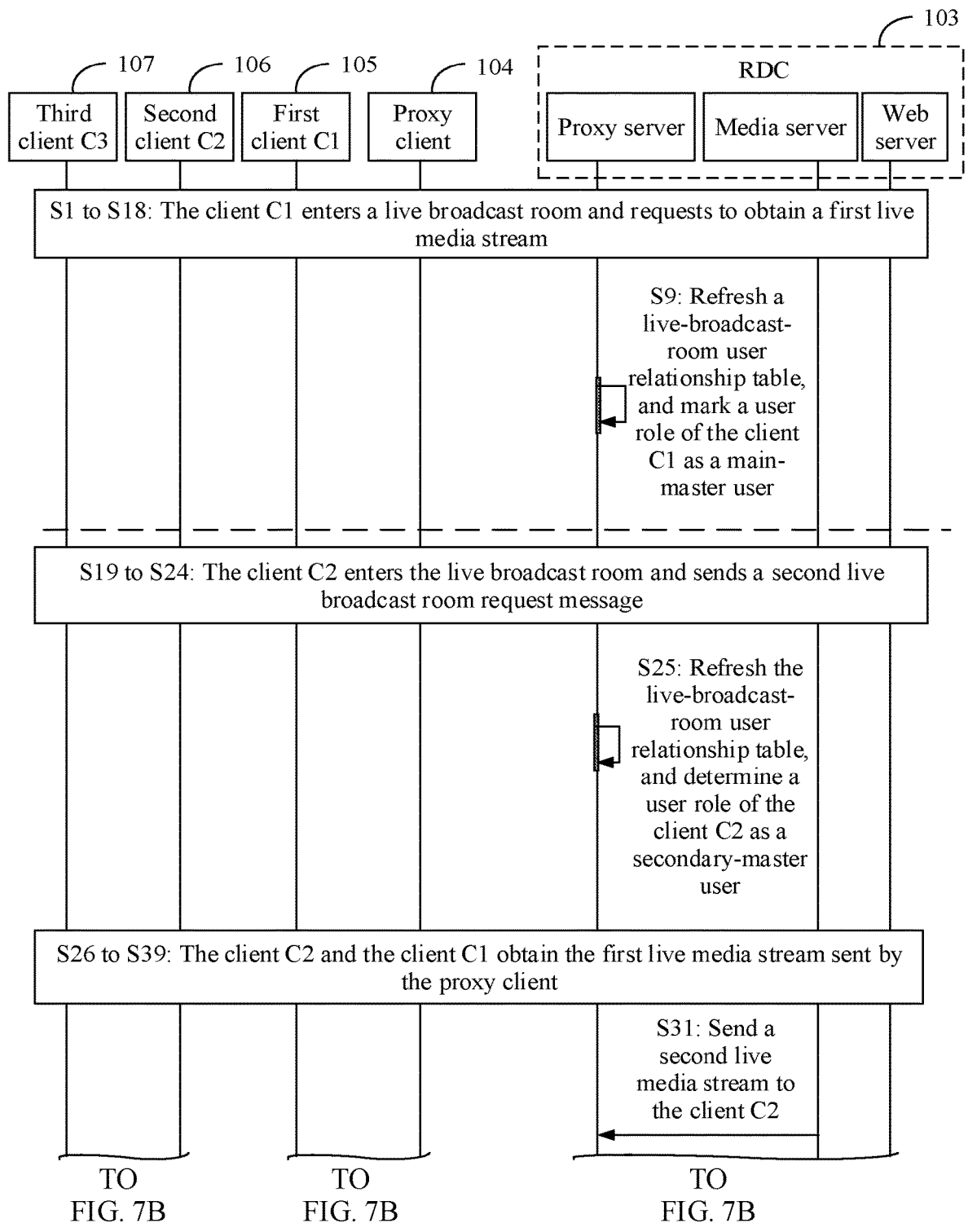
FIG. 7A to FIG. 7C are a signaling flowchart of still another media stream sending method according to an embodiment of this application.
Figure 7B:
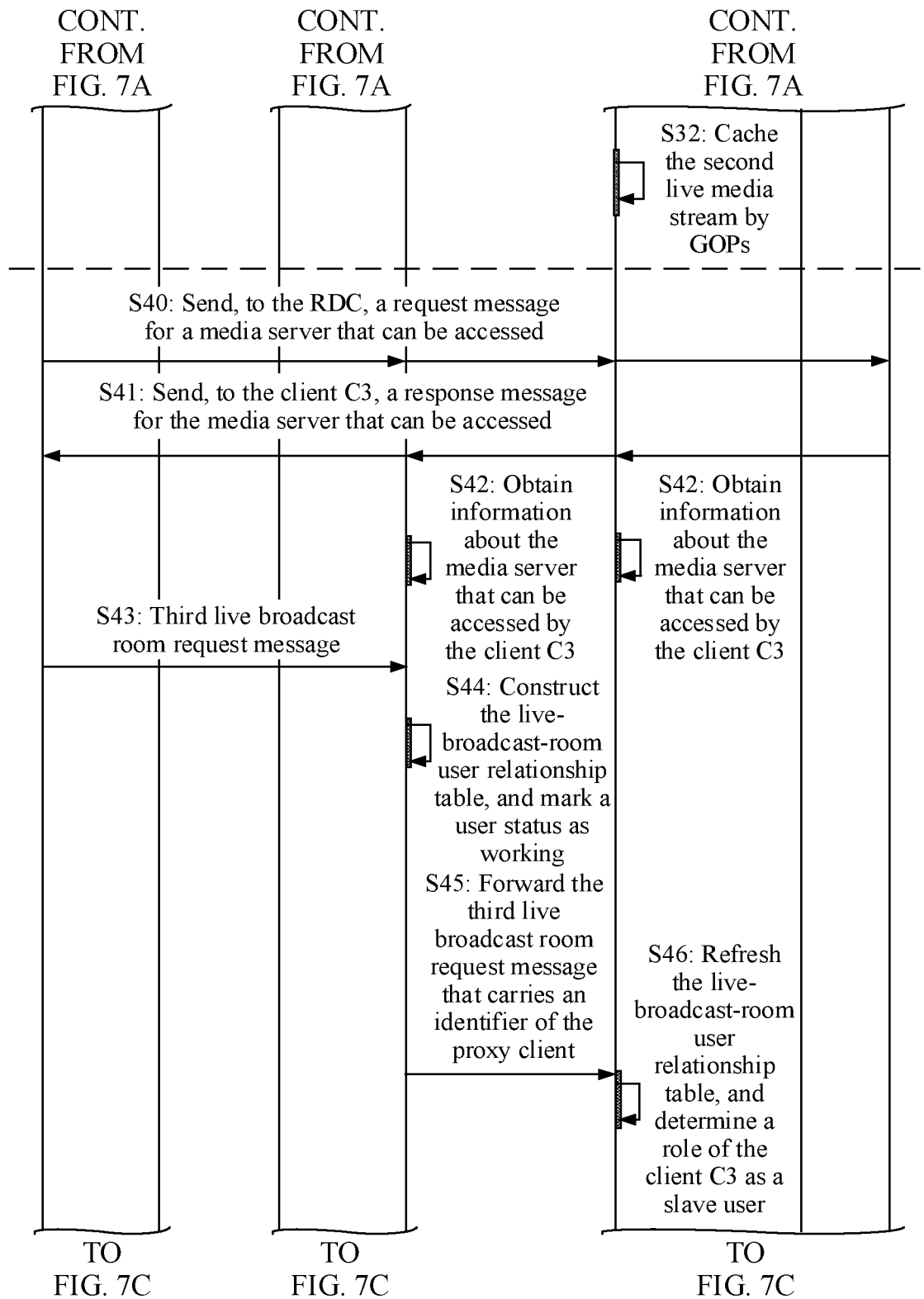
Figure 7C:
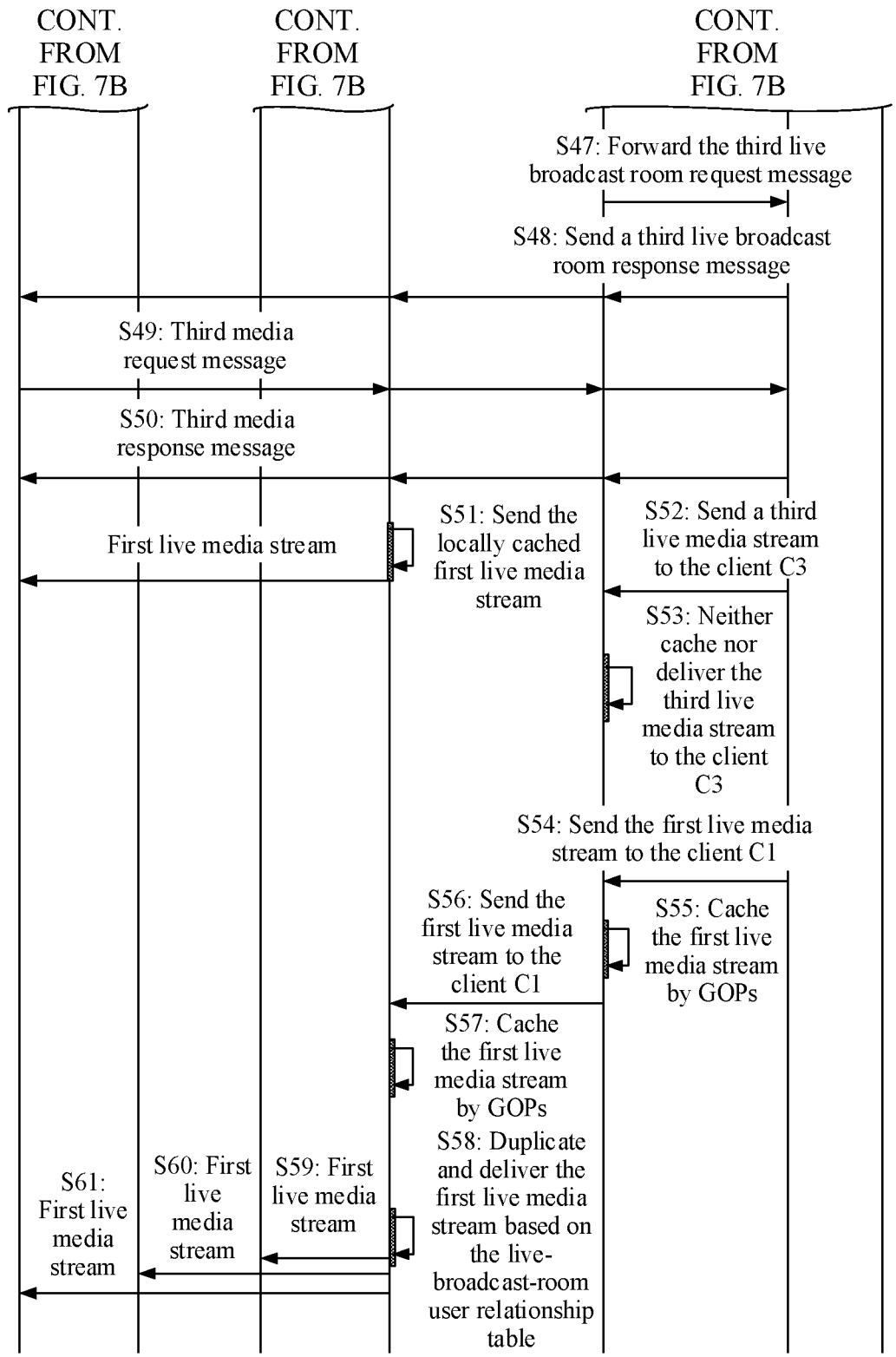

Further, in this embodiment, a third client ("client C3" for short hereinafter) is further included, and a preset upper limit of a quantity of master users in the live broadcast room is set to 2. In this case, a process in which each client enters the live broadcast room and requests to obtain a live media stream is as follows. As shown in FIG. 7A to FIG. 7C, the process includes the following steps.

S1 to S18 are a process in which a client C1 enters the live broadcast room and requests to obtain a live media stream. This process is the same as S1 to S18 in Embodiment 1, and an only difference lies in S9, where a role of the client C1 is marked or set as a main-master user when a "live-broadcast-room user relationship table" is refreshed. For the other steps, refer to the descriptions in Embodiment 1. Details are not described herein again.

When a proxy server obtains a first live media stream sent by a media server, the proxy server locally caches three segments of the first live media stream by GOPs, and sends, to the client C1, the segments of the first live media stream in real time through a proxy client.

S19 to S39 are a process in which a client C2 enters the live broadcast room and requests to obtain a live media stream. Further, S19 to S24 are a process in which the client C2 enters the live broadcast room through the proxy client and sends a second live broadcast room request message to the proxy client. The process is the same as the process from S19 to S24 in Embodiment 1. Therefore, reference may be made to the specific descriptions in Embodiment 1, and details are not described herein again.

S25: After receiving the second live broadcast room request message sent by the proxy client, the proxy server determines a role of the client C2 based on the second live broadcast room request message. Further, the proxy server determines, when obtaining the second live broadcast room request message, whether a quantity of clients whose roles are master users and that enter the live broadcast room through the proxy client reaches a preset upper limit. If the quantity reaches the preset upper limit, the proxy server determines that the client C2 is a slave user. If the quantity does not reach the preset upper limit and the quantity of clients serving as master users is not 0, the proxy server determines that the client C2 is a secondary-master user. In this embodiment, the preset upper limit is 2, and the proxy server determines that a total of two live broadcast room request messages are obtained currently such as a first live broadcast room request message from the client C1 and the second live broadcast room request message from the client C2, and a role of the client C1 is a main-master user. In this case, the quantity of clients serving as master users in the live broadcast room is 1, and the quantity does not reach the preset upper limit. Therefore, the proxy server determines that the role of the client C2 is the secondary-master user.

In addition, the method further includes refreshing an entry about the client C2 in the "live-broadcast-room user relationship table", and marking the role of the client C2 as the secondary-master user.

The method further includes S26 to S39. S26 to S39 are a process in which the client C2 obtains the first live media stream sent by the proxy client and the proxy client sends the first live media stream to the client C1. The process from S26 to S39 is the same as the process from S26 to S39 in Embodiment 1. Therefore, details are not described in this embodiment again.

However, in S32, after the proxy server obtains a second live media stream from the media server, where the second live media stream is a media stream that is sent to the client C2 and the role of the client C2 is the secondary-master user, the proxy server locally caches the second live media stream by GOPs, and aligns the first live media stream and the second live media stream according to an alignment algorithm.

Further, the process in which the proxy server aligns the first live media stream and the second live media stream according to an alignment algorithm includes each time the proxy server receives an I frame of the first live media stream, the proxy server compares the I frame with an I frame of the locally cached second live media stream; and each time the proxy server receives an I frame of the second live media stream, the proxy server compares the I frame with an I frame of the locally cached first live media stream. If the proxy server finds, through the foregoing comparison, an I frame belonging to the first live media stream and an I frame belonging to the second live media stream (which are referred to as an I frame a and an I frame b hereinafter), where the two I frames have same media content, the proxy server determines that the two live media streams are aligned. It can be understood that the I frame a and the I frame b are a same video frame. Further, the proxy server determines switching points based on the I frame a and the I frame b. To be specific, the proxy server determines the last frame (which is referred to as a switching frame x hereinafter) of the first live media stream that is sent to the client C2 and the first frame (which is referred to as a switching frame y hereinafter) of the second live media stream that is sent to the client C2, where the switching frame x and the switching frame y are adjacent frames. Further, the proxy server may determine the nth frame after the I frame a in the first live media stream as the switching frame x, and determine the (n+1)th frame after the I frame b in the second live media stream as the switching frame y, where n is an integer greater than or equal to 0. Because the I frame a and the I frame b are the same video frame, the nth frame after the I frame a and the (n+1)th frame after the I frame b are naturally adjacent frames.

In this embodiment, for the second client whose role is the secondary-master user, after the proxy server obtains the second live media stream sent by the media server, the proxy server locally caches the second live media stream for subsequent use.

The following steps S40 to S61 are a process in which the client C3 enters the live broadcast room and requests and obtains a live media stream. Details are as follows.

S40: The client C3 sends, to a web server in an RDC, a request message for a media server that can be accessed by the client C3. Further, the request message includes information such as a user name and an IP address that are of the client C3, a name of the live broadcast room, and a key token obtained after the client C3 is successfully authenticated, where the IP address is used to determine a location of the client C3.

S41: The web server in the RDC receives the request message, and sends, to the client C3, a response message for the media server that can be accessed by the client C3, where the response message is used to notify the client C3 of the media server that can be accessed by the client C3. Further, the web server in the RDC sends the response message to the proxy server, the proxy server sends the response message to the proxy client, and the proxy client forwards the response message to the client C3.

The web server determines the location of the client C3 based on the IP address carried in the request message, sent by the client C3, that is for the media server that can be accessed by the client C3, and selects a media server closest to the client C3 as a target media server based on the location information.

S42: The response message carries related information of the target media server, for example, URL information, an IP address, and a port number that are of the target media server. Therefore, when forwarding the response message, the proxy server and the proxy client obtain information about the media server that can be accessed by the client C3, that is, the related information of the target media server.

S43: The client C3 sends, to the proxy client, a third live broadcast room request message for requesting to enter the live broadcast room, where the third live broadcast room request message indicates that the client C3 requests to enter the live broadcast room. The third live broadcast room request message includes the user name, the IP address, and a port number that are of the client C3, the name of the live broadcast room, the token obtained after authentication succeeds, and the like.

S44: The proxy client receives the third live broadcast room request message, and sets a status of the client C3 to a working state. In addition, the proxy client updates the "live-broadcast-room user relationship table", and adds an entry about the client C3 in the live-broadcast-room user relationship table. Further, content of the entry includes information such as the IP address, the port number, the user status, and the user name that are of the client C3, the IP address and the port number that are of the selected target media server in the RDC, and the name of the live broadcast room. The user status of the client C3 is working. In addition, the entry further includes: an identifier of the proxy client, for example, an IP address and a port number of the proxy client.

In addition, the method further includes the proxy client adds the identifier of the proxy client to the third live broadcast room request message, where the identifier of the proxy client is the IP address, the port number, or the like of the proxy client.

S45: The proxy client sends, to the proxy server, the third live broadcast room request message to which the identifier of the proxy client is added, where the modified third live broadcast room request message includes information such as the identifier of the proxy client, the user name of the client C3, the name of the live broadcast room, and the token obtained after authentication succeeds.

S46: The proxy server receives the modified third live broadcast room request message, determines a role of the client C3 based on the third live broadcast room request message, and refreshes the live-broadcast-room user relationship table. Further, the determining a role of the client C3 includes, when the third live broadcast room request message is received, determining whether a quantity of master users that enter the live broadcast room through the proxy client reaches a preset upper limit; and if the quantity reaches the preset upper limit, determining that the role of the client C3 is a slave user; or if the quantity does not reach the preset upper limit and the quantity of master users is not 0, determining that the role of the client C3 is a secondary-master user. In this embodiment, the preset upper limit is 2; and when the client C3 enters the live broadcast room through the proxy client, the quantity of clients serving as master users is 2 currently, which is equal to the preset upper limit. Therefore, the proxy server determines that the role of the client C3 is a slave user.

In addition, the method further includes, after determining the role of the client C3, the proxy server refreshes the "live-broadcast-room user relationship table", and marks the role of the client C3 as a slave user.

S47: The proxy server sends the third live broadcast room request message to the media server in the RDC. The third live broadcast room request message does not include the identifier of the proxy client.

S48: The media server in the RDC receives the third live broadcast room request message, and sends a third live broadcast room response message to the client C3, where the third live broadcast room response message is used to notify the client C3 that the client C3 successfully enters the live broadcast room. Further, first, the media server sends the third live broadcast room response message to the proxy server, then the proxy server sends the third live broadcast room response message to the proxy client, and finally the proxy client forwards the third live broadcast room response message to the client C3.

S49: The client C3 sends a third media request message, where the third media request message is used to request to obtain a live media stream from the media server. Optionally, the third media request message carries an identifier of the client C3, where the identifier is used to uniquely identify the client C3. In this embodiment, the identifier includes the IP address and the user name that are of the client C3 and the like.

S50: After receiving the third media request message, the media server sends a third media response message to the client C3, where the third media response message is used to notify the client C3 that the client C3 is allowed to obtain the live media stream. Further, the media server forwards the third media response message to the client C3 through the proxy server and the proxy client.

S51: The proxy client sends the locally cached first live media stream to the client C3. Before sending the first live media stream, the proxy client further needs to adjust a timestamp of the first live media stream such that a timestamp of the first frame of the first live media stream received by the client C3 is 0, and that timestamps of adjacent frames of the first live media stream sent to the client C3 are consecutive.

S52: The media server sends a third live media stream to the proxy server, where the third live media stream comes from a content source, and the third live media stream is a media stream sent to the client C3.

S53: After receiving the third live media stream, the proxy server neither caches nor forwards the third live media stream, because the role of the client C3 is the slave user.

S54. The proxy server receives, in real time, the first live media stream sent by the media server.

S55: The proxy server locally caches the first live media stream by GOPs. The proxy server locally caches only several latest GOPs.

S56: The proxy server sends the cached first live media stream to the proxy client.

S57: The proxy client locally caches the first live media stream by GOPs.

S58: The proxy client duplicates the first live media stream based on the live-broadcast-room user relationship table. In this embodiment, in addition to the client C1 serving as the main-master user, there is the client C2 serving as the secondary-master user and the client C3 serving as the slave user, and therefore the proxy client makes two copies of the first live media stream.

S59: The proxy client sends the first live media stream to the client C1. In addition, the method further includes the proxy client adjusts the timestamp of the first live media stream based on a time point of playing of the client C1.

S60: The proxy client sends the first live media stream to the client C2. In addition, the method further includes the proxy client adjusts the timestamp of the first live media stream based on a time point of playing of the client C2.

S61: The proxy client sends the first live media stream to the client C3. In addition, the method further includes the proxy client adjusts the timestamp of the first live media stream based on a time point of playing of the client C3.

Further, for the process in which the proxy client adjusts the timestamp of the first live media stream in S59 to S61, refer to the descriptions in the foregoing embodiment. Details are not described herein again.

Figure 8A:
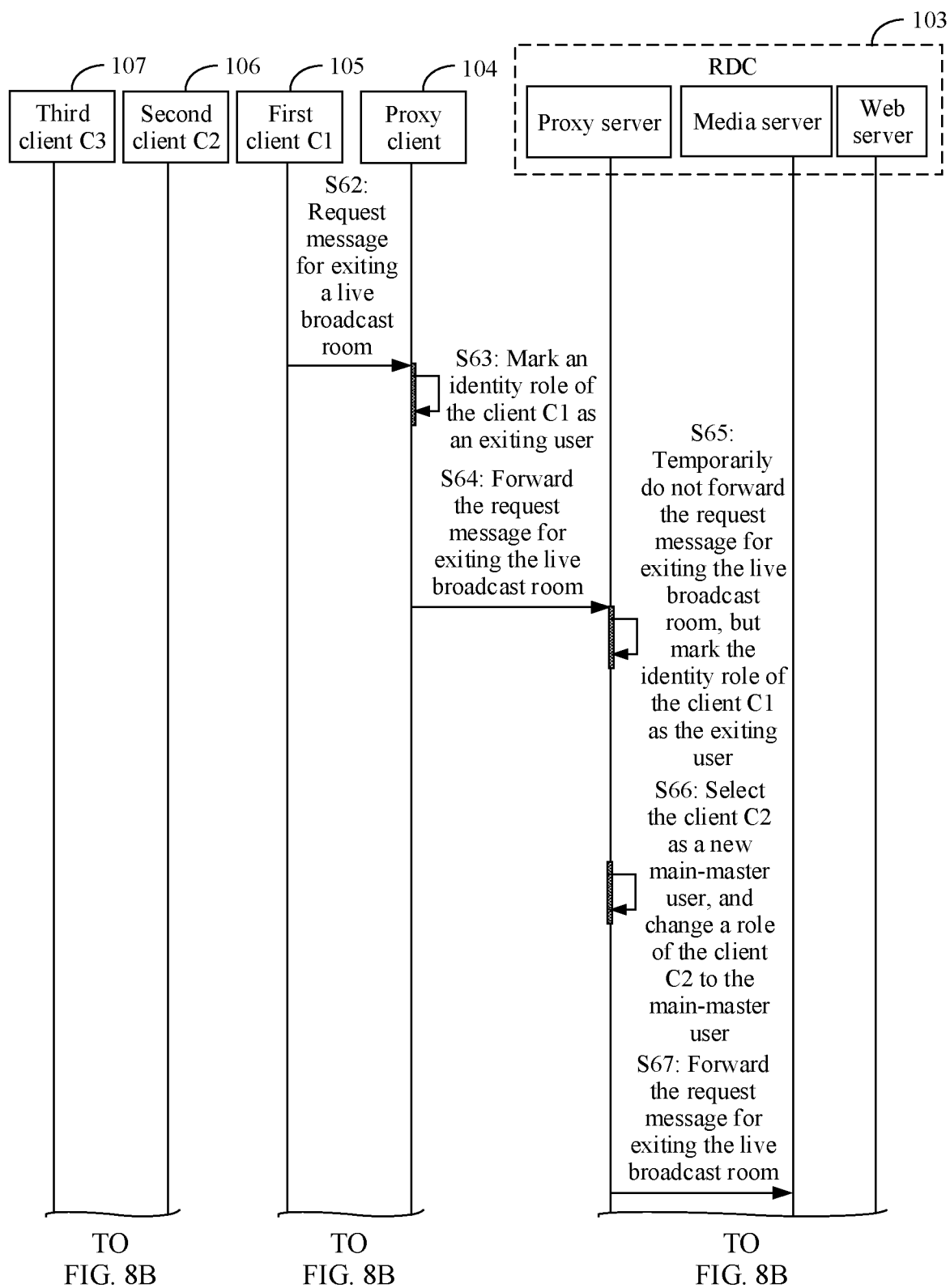
FIG. 8A to FIG. 8C are a signaling flowchart of still another media stream sending method according to an embodiment of this application.
Figure 8B:
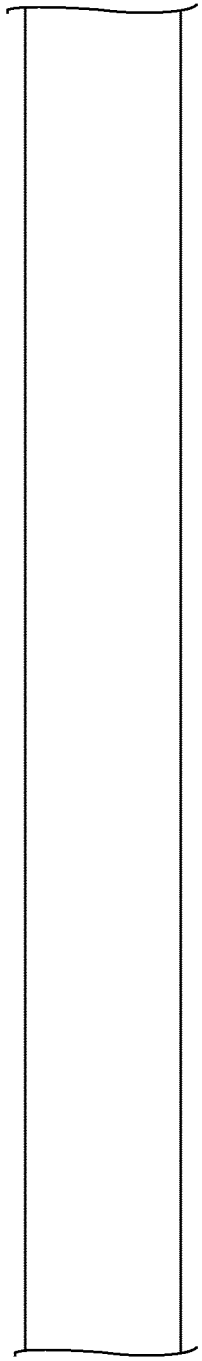
Figure 8B:
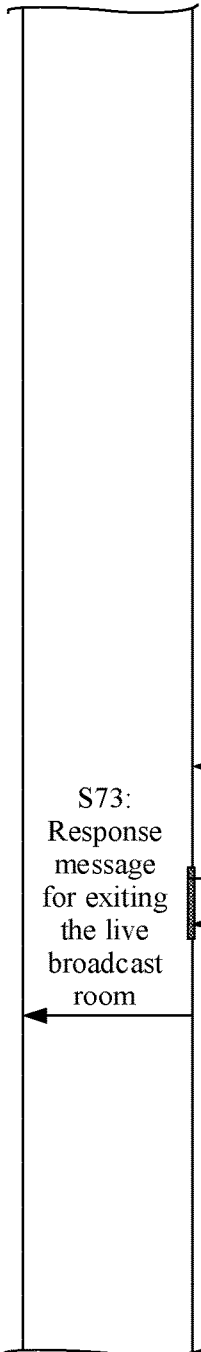
Figure 8B:
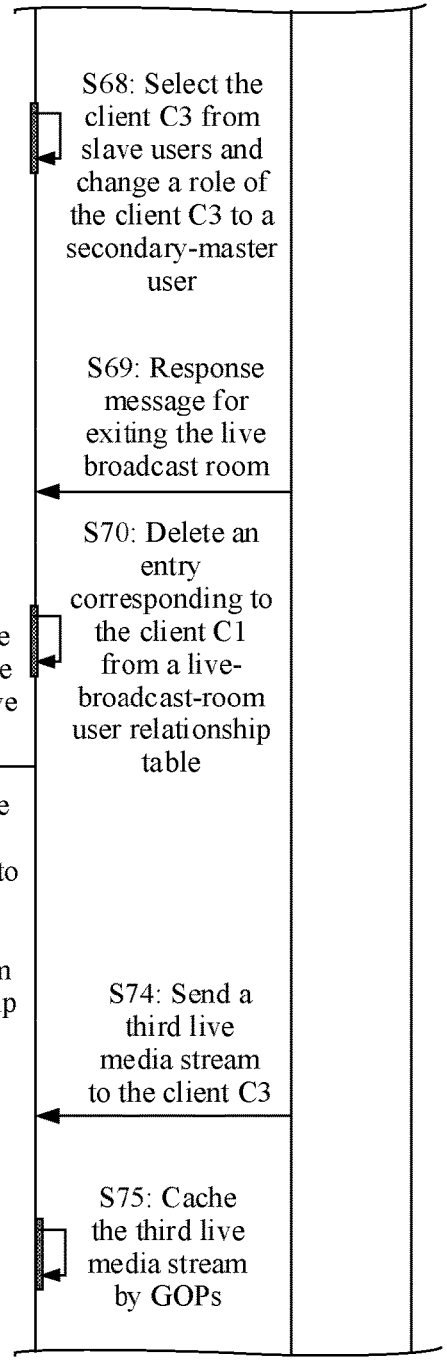
Figure 8C:
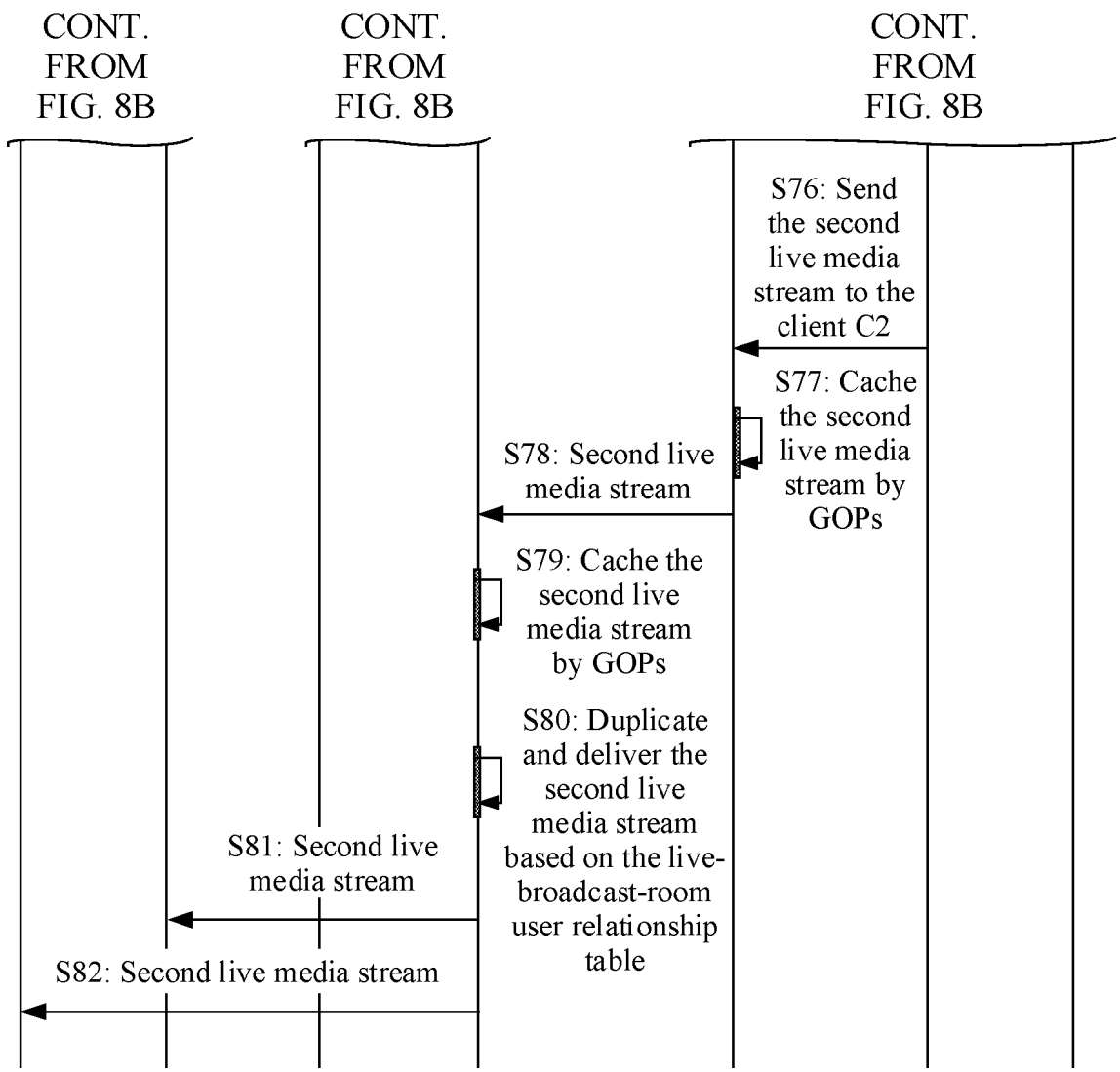

In addition, in this embodiment, the method further includes a process in which the client C1 serving as the main-master user exits the live broadcast room. This process is similar to the process in which the client C1 exits the live broadcast room in Embodiment 1. Details are shown in FIG. 8A to FIG. 8C.

S62 to S65 are the same as S40 to S43 in Embodiment 1.

S66: The proxy server selects the client C2 serving as the secondary-master user as a new main-master user, and changes the role of the client C2 from the secondary-master user to a main-master user, and updates the entry about the client C2 in the "live-broadcast-room user relationship table".

S67 to S73 are the same as S48 to S53 in Embodiment 1.

S74: The media server sends the third live media stream to the proxy server, where the third live media stream is a media stream that is sent to the client C3, and the third live media stream comes from the content source. In this case, the role of the client C3 changes from the slave user to a secondary-master user.

S75: After the proxy server receives the third live media stream, because the role of the client C3 has changed to the secondary-master user, the proxy server locally caches the third live media stream by GOPs, and aligns the second live media stream and the third live media stream according to an alignment algorithm.

In the procedure in which the client C1 exits the live broadcast room, after the proxy server switches, to the second live media stream, the first live media stream that is sent to a client (for example, the client C2) in the live broadcast room, the media server continuously sends the second live media stream to the client C2 through the proxy server. After the switching, the proxy server delivers the continuously received second live media stream to the proxy client. For details, refer to subsequent steps.

S76: The media server sends the second live media stream to the proxy server in real time, where the second live media stream is a media stream that is sent to the client C2, and the second live media stream comes from the content source. In this case, the role of the client C2 changes from the secondary-master user to the main-master user.

S77: After receiving the second live media stream, the proxy server locally caches the second live media stream by GOPs, and aligns the first live media stream and the second live media stream according to an alignment algorithm.

S78: The proxy server sends the second live media stream to the proxy client.

S79: The proxy client receives the second live media stream sent by the proxy server, and locally caches the second live media stream by GOPs.

S80: The proxy client duplicates and delivers the second live media stream based on the "live-broadcast-room user relationship table". In this embodiment, the proxy client makes one copy of the second live media stream, and prepares to send the copy of the second live media stream to the client C3 whose role is the secondary-master user in the live broadcast room.

S81: The proxy client sends the locally cached second live media stream to the client C2. In addition, the method further includes the proxy client adjusts a timestamp of the second live media stream based on a time point at which the client C2 receives a video frame of the media stream.

S82: The proxy client sends the locally cached second live media stream to the client C3. In addition, the method further includes the proxy client adjusts the timestamp of the second live media stream based on a time point at which the client C3 receives a video frame of the media stream.

According to the method provided in this embodiment, when the client C1 serving as the main-master user exits the live broadcast room, the proxy server sends the live media stream of the client C2 serving as the new main-master user to the proxy client, and then the proxy client sends the new live media stream to the clients C2 and C3 in order to ensure that user experience of another user in the live broadcast room is not affected when the main-master user in the live broadcast room exits.

In this embodiment, the proxy server obtains a plurality of live media streams sent by the media server, and each live media stream corresponds to a media request message of one client. However, when sending a media stream to the proxy client, the proxy server sends, to the proxy client, only the live media stream corresponding to the client whose role is the main-master user; locally caches the obtained live media stream of the client whose role is the secondary-master user; and does not cache the obtained live media stream of the client whose role is the slave user, but directly discard the live media stream. Therefore, the proxy server consumes wide area network bandwidth for transmitting the only one live media stream to the proxy client, and saves WAN network resources between the proxy server and the proxy client. On the proxy client side, after receiving the live media stream sent by the proxy server, the proxy client duplicates the live media stream and delivers copies of the live media stream to all clients in the live broadcast room, and adjusts a timestamp of each client before sending the live media stream such that all users that enter the live broadcast room through the proxy client can watch live broadcast content "synchronously".

In addition, the method provided in this embodiment further includes a process in which the client C2 and the client C1 request to exit the live broadcast room synchronously. Further, the process in which the client C2 requests to exit the live broadcast room is similar to the foregoing process in which the client C1 exits the live broadcast room.

Further, first, the client C1 requests to exit the live broadcast room. The process is the same as the foregoing process from S62 to S73 (as shown in FIG. 8A and FIG. 8B), and details are not described again. When the client C1 exits the live broadcast room, the role of the client C2 changes from the secondary-master user to the main-master user, and the role of the client C3 changes from the slave user to the secondary-master user.

After S73, the process in which the client C2 requests to exit the live broadcast room includes the client C2 sends, to the proxy client, a request message for exiting the live broadcast room; after receiving the request message for exiting the live broadcast room, the proxy client marks the status of the client C2 as an exiting user, and forwards the request message for exiting the live broadcast room to the proxy server; after receiving the request message for exiting the live broadcast room, the proxy server refreshes the status of the client C2 as the exiting user in the "live-broadcast-room user relationship table". In this case, the client C3 is still in the live broadcast room and obtains a live media stream, and the proxy server receives the third live media stream sent by the media server, where the third live media stream is a media stream sent to the client C3. In this case, the role of the client C3 changes from the secondary-master user to the main-master user. Therefore, the proxy server locally caches the third live media stream by GOPs.

Because the client C3 is still watching live broadcast content in the live broadcast room, the proxy server needs to switch the live media stream to the third live media stream, and align the third live media stream and the first live media stream. The proxy server sends the third live media stream to the proxy client. After receiving the third live media stream, the proxy client caches and sends the third live media stream to the client C3, and adjusts a timestamp when the proxy client sends the third live media stream such that the third live media stream sent to the client C3 can be seamlessly interconnected to a previous media stream. In this way, when the clients C1 and C2 exit, the client C3 is not affected, thereby ensuring smoothness of media content watched by the client C3 that is still in the live broadcast room.

In addition, the method further includes the proxy server and the proxy client delete the entry about the client C2 from the "live-broadcast-room user relationship table" when forwarding the response message, of the client C2, for exiting the live broadcast in order to update information about clients in the live broadcast room in real time.

It should be noted that, in the foregoing Embodiment 1 and Embodiment 2, all the clients that enter the live broadcast room through a same proxy client, and the proxy server identifies a role of each client and delivers a live media stream. In addition, there is another case. A plurality of proxy clients accesses a same proxy server. For all clients that enter a same live broadcast room through the plurality of proxy clients, the proxy server collectively identifies user roles for all the clients that enter the live broadcast room through the plurality of proxy clients. For example, when three proxy clients access a same proxy server, the proxy server centrally identifies master users and slave users for all the clients in the live broadcast room, and sends a live media stream to each proxy client based on identified roles. Further, the process in which the proxy server identifies the user roles and sends the live media stream to each proxy client and each proxy client duplicates the live media stream and delivers copies of the live media stream to all the clients accessed to the proxy client as the process in the method in the Embodiment 1 and Embodiment 2. Details are not described herein again.

According to the bilateral proxy technology for video live broadcast provided in this embodiment of this application, the proxy client and the proxy server are used. The proxy server is configured to identify a role of each client based on a live broadcast room request message, and send only one live media stream of a client whose role is a master user to the proxy client. After receiving the live media stream of the master user, the proxy client duplicates the live media stream and delivers copies of the live media stream to all clients accessed to the proxy client. This method effectively reduces traffic for sending media streams between the proxy server and the proxy client, reduces egress bandwidth, and reduces WAN network overheads.

In addition, according to the method, the media server does not need to configure independent authentication for the client, and the proxy client centrally performs forwarding, thereby further reducing operation and maintenance costs.

The following describes apparatus and hardware device embodiments corresponding to the foregoing method embodiments of this application.

Figure 9:
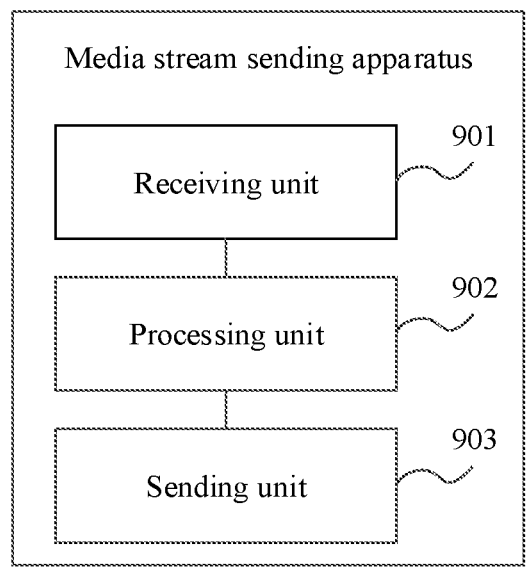
FIG. 9 is a schematic structural diagram of a media stream sending apparatus according to an embodiment of this application.

FIG. 9 is a schematic structural diagram of a media stream sending apparatus according to an embodiment of this application. The apparatus may be the proxy server or the proxy client described in the foregoing embodiments.

Further, the apparatus includes a receiving unit 901, a processing unit 902, and a sending unit 903. In addition, the apparatus may further include another functional module or unit, for example, a storage unit. The apparatus may be a server, and is configured to perform the media stream sending method in the foregoing embodiments. For example, the apparatus provides a live media stream for at least two clients that enter a live broadcast room through a same proxy client.

Further, when the apparatus is a proxy server, the receiving unit 901 is configured to receive a first live broadcast room request message and a second live broadcast room request message that are used to request to enter the live broadcast room and that are sent by a same proxy client, where the first live broadcast room request message is from a first client, and the second live broadcast room request message is from a second client. The receiving unit 901 is further configured to receive a first live media stream that is sent by a media server to the first client through the proxy server and a second live media stream that is sent by the media server to the second client through the proxy server. The processing unit 902 is configured to determine a role of the first client based on the first live broadcast room request message, and determine a role of the second client based on the second live broadcast room request message. The sending unit 903 is configured to, when it is determined that the role of the first client is a master user and that the role of the second client is a slave user, send only the first live media stream to the first client and the second client.

The first live broadcast room request message includes an identifier of the proxy client, and the second live broadcast room request message includes the identifier of the proxy client. The processing unit 902 is further configured to determine, based on the identifier of the proxy client included in the first live broadcast room request message and the identifier of the proxy client included in the second live broadcast room request message, that the first live broadcast room request message and the second live broadcast room request message are from the same proxy client.

Optionally, in a specific implementation of this embodiment, the processing unit 902 is further configured to, when the second live broadcast room request message is received, determine whether there is a client, in the live broadcast room, whose role is a master user in the live broadcast room and that enters the live broadcast room through the proxy client; and if there is a client, in the live broadcast room, whose role is a master user in the live broadcast room and that enters the live broadcast room through the proxy client, determine that the role of the second client is the slave user. Otherwise, if there is no client whose role is a master user in the live broadcast room and that enters the live broadcast room through the proxy client, the processing unit 902 determines that the role of the second client is a master user.

Optionally, in another specific implementation of this embodiment, the receiving unit 901 is further configured to, after the first live media stream is sent to the proxy client, receive a request message that is sent by the proxy client and that is for exiting the live broadcast room, where the request message for exiting the live broadcast room is used to request the first client to exit the live broadcast room. The processing unit 902 is further configured to, when determining the second client as a new master user, change the role of the second client from the slave user to a master user; and switch, to the second live media stream, the first live media stream that is sent to the second client.

Optionally, in still another specific implementation of this embodiment, the last frame of the first live media stream that is sent to the second client and the first frame of the second live media stream that is sent to the second client are adjacent frames. The processing unit 902 is further configured to identify, based on the first live media stream and the second live media stream, a first I frame and a second I frame that belong to the first live media stream and the second live media stream respectively, where the first I frame and the second I frame are a same video frame; determine, based on the first I frame and the second I frame, a first switching frame and a second switching frame that are adjacent to each other and that belong to the first live media stream and the second live media stream respectively, and use the first switching frame and the second switching frame as the last frame of the first live media stream that is sent to the second client and the first frame of the second live media stream that is sent to the first client, respectively. The sending unit 903 is further configured to, after the first switching frame and the second switching frame are determined, forward the request message for exiting the live broadcast room from the first client to the media server.

Optionally, in still another specific implementation of this embodiment, the processing unit 902 is further configured to, when the second live broadcast room request message is received, determine whether a quantity of clients whose roles are master users and that enter the live broadcast room through the proxy client reaches a preset upper limit, where the preset upper limit is greater than or equal to 2; and if the quantity of clients whose roles are master users and that enter the live broadcast room through the proxy client reaches the preset upper limit, determine that the role of the second client is the slave user.

Correspondingly, if the quantity of clients whose roles are master users is not 0 and does not reach the preset upper limit, the processing unit 902 determines that the role of the second client is a secondary-master user.

Optionally, in still another specific implementation of this embodiment, when the first client is a main-master user, and the second client is the slave user, the receiving unit 901 is further configured to receive, from the first client, a request message for exiting the live broadcast room. The processing unit 902 is further configured to, when determining the second client as a new secondary-master user, change the role of the second client from the slave user to a secondary-master user. The storage unit is configured to cache the received second live media stream by GOPs.

Optionally, in still another specific implementation of this embodiment, when the first client is a main-master user, and the second client is the secondary-master user, the storage unit is configured to cache the received second live media stream by GOPs. The processing unit 902 is further configured to identify, based on the first live media stream and the cached second live media stream, a first I frame and a second I frame that belong to the first live media stream and the second live media stream respectively, where the first I frame and the second I frame are a same video frame.

Optionally, in still another specific implementation of this embodiment, the receiving unit 901 is further configured to receive, from the first client, a request message for exiting the live broadcast room. The processing unit 902 is further configured to, when determining the second client as a new main-master user, change the role of the second client from the slave user to a master user; determine, based on the first I frame and the second I frame, a first switching frame and a second switching frame that are adjacent to each other and that belong to the first live media stream and the second live media stream respectively; and switch, to the second live media stream based on the first switching frame and the second switching frame, the first live media stream sent to the second client, where the last frame of the first live media stream sent to the second client is the first switching frame, and the first frame of the second live media stream sent to the first client is the second switching frame.

Optionally, in still another specific implementation of this embodiment, the storage unit is configured to cache the first live media stream and the second live media stream by GOPs.

In addition, when the apparatus is a proxy client, the receiving unit 901 is configured to receive a first live broadcast room request message that is sent by a first client, and a second live broadcast room request message that is sent by a second client. The sending unit 903 is configured to send the first live broadcast room request message and the second live broadcast room request message to a media server through a proxy server. The receiving unit 901 is further configured to receive a first live media stream sent by the proxy server, where the first live media stream is a media stream that is sent by the media server to the first client through the proxy server, a role of the first client is a master user, and a role of the second client is a slave user. The sending unit 903 is further configured to send the first live media stream to the first client and the second client.

Further, the processing unit 902 is configured to, before the first live broadcast room request message is sent, add an identifier of the proxy client to the first live broadcast room request message; and before the second live broadcast room request message is sent, add the identifier of the proxy client to the second live broadcast room request message.

The apparatus further includes the storage unit configured to cache the first live media stream by GOPs.

Optionally, in a specific implementation of this embodiment, the processing unit 902 is further configured to mark a status of the first client as working when the first live broadcast room request message is received; mark a status of the second client as working when the second live broadcast room request message is received; and mark the status of the first client as exiting when the request message for exiting the live broadcast room is received.

Optionally, in a specific implementation of this embodiment, the processing unit 902 is further configured to, before the first live media stream is sent to the second client, adjust a timestamp of the first live media stream such that an adjusted timestamp satisfies that a timestamp of the first frame of the first live media stream sent to the second client is 0, and that timestamps of adjacent frames of the first live media stream sent to the second client are consecutive.

Optionally, in a specific implementation of this embodiment, when the first client requests to exit the live broadcast room, the receiving unit 901 is further configured to receive a second live media stream sent by the proxy server, where the second live media stream is a media stream that is sent by the media server to the second client through the proxy client, and the second client is a client whose role changes from the slave user to a master user. The sending unit 903 is further configured to send the second live media stream to the second client.

Optionally, in a specific implementation of this embodiment, the processing unit 902 is further configured to, before the second live media stream is sent to the second client, adjust a timestamp of the second live media stream such that an adjusted timestamp satisfies that a timestamp of the first frame of the second live media stream sent to the second client and the last frame of the first live media stream sent to the second client are consecutive.

Figure 10:
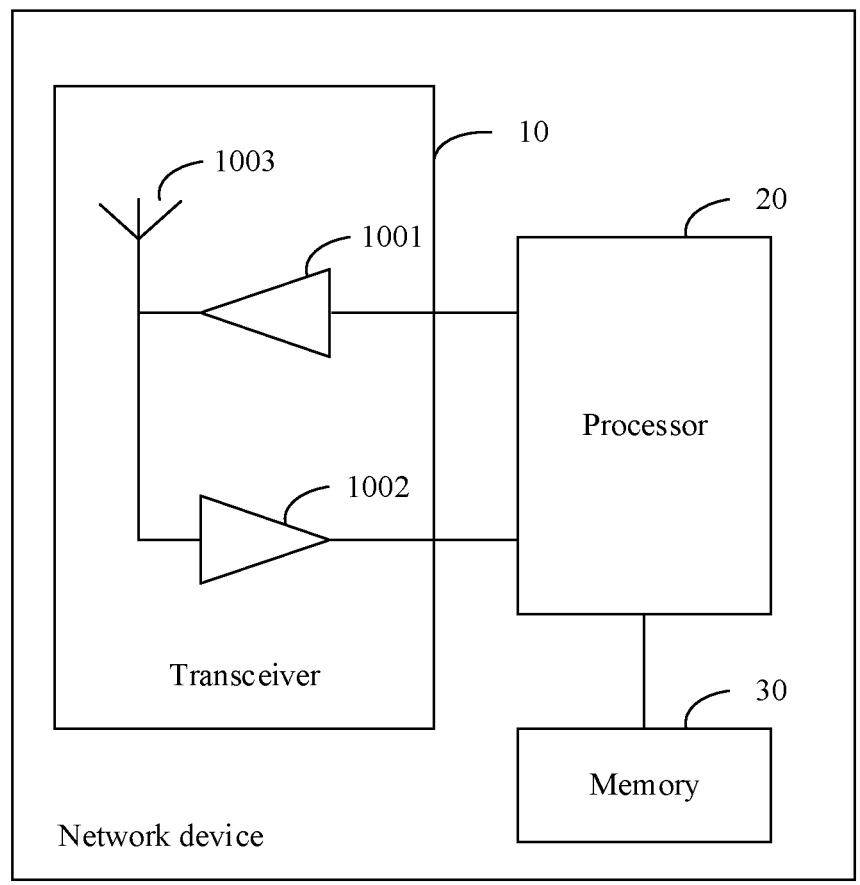
FIG. 10 is a schematic structural diagram of a network device according to an embodiment of this application.

In a specific hardware implementation, as shown in FIG. 10, this application further provides a network device. The network device may be the proxy server or the proxy client in the foregoing method embodiments, or may be another device or apparatus in a CDN system.

Further, the network device includes a transceiver 10, a processor 20, and a memory 30. The network device may alternatively include more or fewer components, or some components may be combined, or components may be differently arranged. This is not limited in this application.

The transceiver 10 is configured to receive and send a request message, a response message, a live media stream, and the like, and perform data transmission with another device (a client, a media server, or the like) in a network. Further, the transceiver 10 may include components such as a receiver 1001, a transmitter 1002, and an antenna 1003, or may further include a transceiver module. Further, the transceiver module may include a communication module such as a wireless local area network (WLAN) module, a Bluetooth module, or a baseband module, and may include a radio frequency (RF) circuit corresponding to the communication module, where the radio frequency circuit is configured to perform wireless local area network communication, Bluetooth communication, infrared communication, and/or cellular communication system communication, for example, wideband code division multiple access (WCDMA) and/or high speed downlink packet access (HSDPA). The transceiver module is configured to control communication between components in a network device, and may support direct memory access.

The processor 20 is a control center of the network device, and is connected to various parts of the entire network device through various interfaces and lines. The processor 20 runs or executes a software program and/or a unit stored in the memory 30, and invokes data stored in the memory 30, to perform various functions of the network device and/or process data.

Further, the processor 20 may include an integrated circuit (IC), for example, may include a single packaged IC, or may include a plurality of connected packaged ICs that have a same function or different functions. For example, the processor may include only a central processing unit (CPU), or may be a combination of a graphics processing unit (GPU), a digital signal processor (DSP), and a control chip (such as a baseband chip) in the transceiver.

The memory 30 may include a volatile memory, for example, a random access memory (RAM); or may include a non-volatile memory, for example, a flash memory, a hard disk drive (HDD), or a solid-state drive (SSD). The memory may further include a combination of the foregoing types of memories. The memory may store a program or code. The processor 20 executes the program or the code to implement functions of the communication device.

In this embodiment, when the network device is a proxy server, the functions of the receiving unit 901 and the sending unit 903 in the apparatus embodiment shown in FIG. 9 may be implemented by the transceiver 10, or may be implemented by the transceiver 10 controlled by the processor 20. The functions of the processing unit 902 may be implemented by the processor 20. The functions of the storage unit may be implemented by the memory 30.

When the network device is a proxy client, the functions of the receiving unit 901 and the sending unit 903 in the apparatus embodiment shown in FIG. 9 may be implemented by the transceiver 10, or may be implemented by the transceiver 10 controlled by the processor 20. The functions of the processing unit 902 may be implemented by the processor 20. The functions of the storage unit may be implemented by the memory 30.

In addition, an embodiment of this application further provides a media stream sending system. The system includes the media stream sending apparatus shown in FIG. 9 or the network device shown in FIG. 10, and further includes devices such as a plurality of clients, an RDC, an EDC, and a content source in order to implement the media stream sending method in the foregoing method embodiments.

Optionally, the media stream sending system is a video live broadcast system, for example, a CDN system.

In addition, this application further provides a computer storage medium. The computer storage medium may store a program. When the program is executed, some or all of the steps of the embodiments of the content sending method and content receiving method provided in this application may be performed. The storage medium may be a magnetic disk, an optical disc, a read-only memory (ROM), a random access memory (RAM), or the like.

All or some of the foregoing embodiments may be implemented using software, hardware, firmware, or any combination thereof. When software is used to implement the functions, all or some of the functions may be implemented in a form of a computer program product.

The computer program product includes one or more computer instructions. When the computer program is loaded and executed on a computer, all or some of the procedures or functions according to the foregoing embodiments of this application are generated. The computer may be a general-purpose computer, a dedicated computer, a computer network, or another programmable apparatus.

The computer instructions may be stored in a computer-readable storage medium, or may be transmitted from a computer-readable storage medium to another computer-readable storage medium. For example, the computer instructions may be transmitted from a website, a computer, a server, or a data center to another website, computer, server, or data center in a wired or wireless manner.

For same or similar parts in the embodiments in this specification, refer to each other. Especially, the embodiments of the media stream sending apparatuses are basically similar to method embodiments, and therefore is described briefly. For related parts, refer to descriptions in the method embodiments.

A person skilled in the art may clearly understand that, the technologies in the embodiments of the present disclosure may be implemented by software in addition to a necessary general hardware platform. Based on such an understanding, the technical solutions in the embodiments of the present disclosure essentially, or the part contributing to the conventional technology may be implemented in a form of a software product. The computer software product may be stored in a storage medium, such as a ROM/RAM, a magnetic disk, or an optical disc, and includes several instructions for indicating a computer device (which may be a personal computer, a server, a network device, or the like) to perform the methods described in the embodiments or some parts of the embodiments of the present disclosure.

In addition, in the descriptions of this application, "a plurality of" means two or more than two unless otherwise specified. In addition, for convenience of clear description of the technical solutions in the embodiments of this application, terms such as "first" and "second" are used to distinguish between same objects or similar objects whose functions and purposes are basically the same. A person skilled in the art may understand that the terms such as "first" and "second" do not limit a quantity or an execution sequence, and the terms such as "first" and "second" do not indicate a definite difference.

The foregoing implementations of this application do not constitute any limitation on the protection scope of this application.

What is claimed is:

1. A method implemented by a proxy client, wherein the method comprises:

receiving, from a first client, a first live broadcast room request message that requests entry to a live broadcast room, wherein a role of the first client is a master user;

receiving, from a second client, a second live broadcast room request message that requests entry to the live broadcast room, wherein a role of the second client is a slave user;

sending, to a media server through a proxy server, the first live broadcast room request message and the second live broadcast room request message;

receiving, from the proxy server, a first live media stream that originates from the media server and is destined for the first client; and sending the first live media stream to the first client and the second client after the first client and the second client enter the live broadcast room, wherein when the first client requests to exit from the live broadcast room, the method further comprises:

receiving, from the proxy server, a second live media stream, wherein the second live media stream originates from the media server and is destined for the second client, and wherein the role of the second client has changed from the slave user to a master user; and sending the second live media stream to the second client responsive to receiving the second live media stream.

2. The method of claim 1, further comprising:

adding an identifier of the proxy client to the first live broadcast room request message before sending the first live broadcast room request message to the media server; and adding the identifier to the second live broadcast room request message before sending the second live broadcast room request message to the media server.

3. The method of claim 2, wherein after receiving the first live media stream, the method further comprises caching the first live media stream by groups of pictures.

4. The method of claim 2, wherein before sending the first live media stream to the second client, the method further comprises:

adjusting a timestamp of the first live media stream to an adjusted timestamp; and sending a first frame and adjacent frames of the first live media stream to the second client, wherein the adjusted timestamp comprises a first timestamp of the first frame of the first live media stream and is 0, and comprises second timestamps of the adjacent frames and are consecutive.

5. The method of claim 2, further comprising:

receiving, from the first client, an exit request to exit from the live broadcast room;

receiving, from the proxy server, a second live media stream that originates from the media server and is destined for the second client responsive to receiving the exit request from the first client, wherein the role of the second client has changed from the slave user to a master user; and
sending the second live media stream to the second client responsive to receiving the second live media stream.

6. The method of claim 5, wherein before sending the second live media stream to the second client, the method further comprises:
adjusting a timestamp of the second live media stream to an adjusted timestamp;
sending a first frame of the second live media stream to the second client; and
sending a last frame of the first live media stream to the second client, wherein the adjusted timestamp includes a first timestamp of the first frame and is consecutive to a second timestamp of the last frame.

7. The method of claim 1, wherein after receiving the first live media stream, the method further comprises caching the first live media stream by groups of pictures.

8. The method of claim 1, wherein before sending the first live media stream to the second client, the method further comprises:
adjusting a timestamp of the first live media stream to an adjusted timestamp; and
sending a first frame and adjacent frames of the first live media stream to the second client, wherein the adjusted timestamp includes a first timestamp of the first frame and is 0 and is consecutive to second timestamps of the adjacent frames.

9. The method of claim 1, wherein before sending the second live media stream to the second client, the method further comprises:
adjusting a timestamp of the second live media stream to an adjusted timestamp;
sending a first frame of the second live media stream to the second client; and
sending a last frame of the first live media stream to the second client, wherein the adjusted timestamp includes a first timestamp of the first frame and is consecutive to a second timestamp of the last frame.

10. A proxy client, comprising:
a processor; and
a memory coupled to the processor and configured to store instructions that, when executed by the processor, cause the proxy client to:
receive, from a first client, a first live broadcast room request message that requests entry to a live broadcast room, wherein a role of the first client is a master user;
receive, from a second client, a second live broadcast room request message that requests entry to the live broadcast room, wherein a role of the second client is a slave user;
send, to a media server through a proxy server, the first live broadcast room request message and the second live broadcast room request message;
receive, from the proxy server, a first live media stream that originates from the media server and is destined for the first client; and
send the first live media stream to the first client and the second client after the first client and the second client enter the live broadcast room, wherein when the first client requests to exit from the live broadcast room, the instructions further cause the proxy client to:
receive, from the proxy server, a second live media stream that originates from the media server and is destined for the second client, and wherein the role of the second client has changed from the slave user to a master user; and
send the second live media stream to the second client in response to receiving the second live media stream.

11. The proxy client of claim 10, wherein the instructions further cause the proxy client to:
add an identifier of the proxy client to the first live broadcast room request message before sending the first live broadcast room request message; and
add the identifier of the proxy client to the second live broadcast room request message before sending the second live broadcast room request message.

12. The proxy client of claim 11, wherein the instructions further cause the proxy client to cache the first live media stream by groups of pictures.

13. The proxy client of claim 11, wherein the instructions further cause the proxy client to:
adjust a timestamp of the first live media stream to an adjusted timestamp before sending the first live media stream to the second client; and
send a first frame and adjacent frames of the first live media stream to the second client, wherein the adjusted timestamp comprises a first timestamp of the first frame and is 0 and comprises second timestamps of the adjacent frames and are consecutive.

14. The proxy client of claim 10, wherein the instructions further cause the proxy client to cache the first live media stream by groups of pictures.

15. The proxy client of claim 10, wherein the instructions further cause the proxy client to:
adjust a timestamp of the first live media stream to an adjusted timestamp; and
send a first frame and adjacent frames of the first live media stream to the second client, wherein the adjusted timestamp comprises a first timestamp of the first frame and is 0, and comprises second timestamps of the adjacent frames and are consecutive.

16. The proxy client of claim 10, wherein the instructions further cause the proxy client to:
receive, from the proxy server, a second live media stream that originates from the media server and is destined for the second client, wherein the role of the second client changes has changed from the slave user to a master user; and
send the second live media stream to the second client in response to receiving the second live media stream.

17. The proxy client of claim 16, wherein the instructions further cause the proxy client to:
adjust a timestamp of the second live media stream to an adjusted timestamp before sending the second live media stream to the second client;
send a first frame of the second live media stream to the second client; and
send a last frame of the first live media stream to the second client, wherein the adjusted timestamp includes a first timestamp of the first frame and is consecutive to a second timestamp of the last frame.

18. A media stream system comprising:
at least one client;
a proxy server coupled to the at least one client;
a media server coupled to the at least one client and the proxy server, wherein each of the at least one client is configured to access a live broadcast room through a proxy client; and the proxy client coupled to the at least one client, the proxy server, and the media server and configured to:

receive, from a first client, a first live broadcast room request message that requests entry to a live broadcast room, wherein a role of the first client is a master user;

receive, from a second client, a second live broadcast room request message that requests entry to the live broadcast room, wherein a role of the second client is a slave user;

send, to a media server through a proxy server, the first live broadcast room request message and the second live broadcast room request message;

receive, from the proxy server, a first live media stream that originates from the media server and is destined for the first client; and send the first live media stream to the first client and the second client;

and wherein the proxy server is configured to:

receive, from the first client via the proxy client, the first live broadcast room request message;

receive, from the second client via the proxy client, the second live broadcast room request message;

receive, from the media server, the first live media stream;

receive, from the media server, a second live media stream;

identify the role of the first client is a master user based on the first live broadcast room request message;

identify the role of the second client is a slave user based on the second live broadcast room request message;

send, to the proxy client, the first live media stream when the role of the first client is the master user and the role of the second client is the slave user; and skip sending, to the proxy client, the second live media stream when the role of the first client is the master user and the role of the second client is the slave user.

* * * * *